US006954859B1

(12) United States Patent
Simerly et al.

(10) Patent No.: US 6,954,859 B1
(45) Date of Patent: Oct. 11, 2005

(54) NETWORKED DIGITAL SECURITY SYSTEM AND METHODS

(75) Inventors: Tim W. Simerly, Cumming, GA (US); Thomas Szo-Ho Tang, Suwance, GA (US); Amer M. Dutt, Atlanta, GA (US); Philip K. Pledger, Duluth, GA (US); Keith D. Breton, Canton, GA (US); Alan Kay, Lawrenceville, GA (US)

(73) Assignee: Axcess, Inc., Carrollton, TX (US)

( * ) Notice: Subject to any disclaimer, the term of this patent is extended or adjusted under 35 U.S.C. 154(b) by 0 days.

(21) Appl. No.: 09/414,712

(22) Filed: Oct. 8, 1999

(51) Int. Cl.⁷ .............................................. H04N 7/12
(52) U.S. Cl. ...................... 713/201; 725/108; 709/232
(58) Field of Search ........................ 713/201; 348/839, 348/150, 154, 169, 207.99; 709/232; 715/716, 715/719; 725/108, 126

(56) References Cited

U.S. PATENT DOCUMENTS

| | | | |
|---|---|---|---|
| 4,081,830 A | 3/1978 | Mick et al. .................. | 358/105 |
| 4,148,062 A | 4/1979 | Kamin ........................ | 358/105 |
| 4,992,866 A | 2/1991 | Morgan ...................... | 358/108 |
| 5,012,522 A | 4/1991 | Lambert ........................ | 382/2 |
| 5,034,804 A | 7/1991 | Sasaki et al. ............... | 364/401 |
| 5,144,661 A | 9/1992 | Shamosh et al. .............. | 380/9 |
| 5,191,435 A | 3/1993 | Tsunekawa et al. ......... | 358/335 |
| 5,229,850 A * | 7/1993 | Toyoshima ................. | 348/153 |
| 5,237,408 A | 8/1993 | Blum et al. ................. | 358/108 |
| 5,237,676 A | 8/1993 | Arimilli ...................... | 395/550 |
| 5,251,209 A | 10/1993 | Jurkevich .................... | 370/82 |
| 5,276,444 A | 1/1994 | McNair | |
| 5,276,681 A | 1/1994 | Tobagi et al. .............. | 370/85.4 |
| 5,420,861 A | 5/1995 | De La Bourdonnaye ..... | 370/84 |
| 5,491,511 A | 2/1996 | Odle .......................... | 348/153 |
| 5,495,288 A * | 2/1996 | Broady et al. .............. | 348/155 |
| 5,502,485 A | 3/1996 | Suzuki ........................ | 348/231 |
| 5,504,520 A | 4/1996 | Yamamoto et al. ......... | 348/154 |
| 5,517,243 A | 5/1996 | Kudo et al. .................. | 348/296 |
| 5,526,047 A | 6/1996 | Sawanobori ................ | 348/222 |
| 5,546,324 A | 8/1996 | Palmer et al. .............. | 364/514 |
| 5,548,660 A | 8/1996 | Lemelson | |
| 5,550,584 A | 8/1996 | Yamada ...................... | 348/153 |
| 5,600,797 A | 2/1997 | Marshall ................ | 395/200.11 |
| 5,606,599 A | 2/1997 | O'Mahony ................... | 379/93 |
| 5,610,653 A | 3/1997 | Abecassis .................... | 348/110 |
| 5,625,410 A | 4/1997 | Washino ..................... | 348/154 |
| 5,633,678 A | 5/1997 | Parulski et al. ............. | 348/232 |
| 5,638,184 A | 6/1997 | Fujimoto et al. ........... | 386/112 |
| 5,640,202 A | 6/1997 | Kondo et al. ............... | 348/222 |
| 5,640,204 A | 6/1997 | Tsutusi ....................... | 347/231 |
| 5,646,684 A | 7/1997 | Nishizawa et al. ......... | 347/231 |
| 5,657,076 A | 8/1997 | Tapp .......................... | 348/154 |
| 5,666,157 A * | 9/1997 | Aviv .......................... | 348/152 |

(Continued)

Primary Examiner—Justin T. Darrow
(74) Attorney, Agent, or Firm—Alston & Bird LLP

(57) ABSTRACT

A networked digital security system is disclosed that preferably includes a centralized administrator web server coupled via a communication network such as the Internet to a plurality of customer servers and a plurality of customer work stations. The centralized web server advantageously provides a point of control and management of the networked digital security system. The customer servers and customer work stations are preferably located at the customer's monitored sites. The customer servers are coupled to one or more intelligent camera units, which are preferably fully integrated intelligent units that gather, analyze, and transmit video, audio, and associated detected alarm event information to their associated customer server and the administrator web server. The camera units also include an intelligent automatic gain controller, an encoder buffer controller, and a network bandwidth priority controller. The system supports several compression algorithm standards.

39 Claims, 13 Drawing Sheets

U.S. PATENT DOCUMENTS

| | | | | |
|---|---|---|---|---|
| 5,689,442 A * | 11/1997 | Swanson et al. ............. 380/241 |
| 5,692,035 A | 11/1997 | O'Mahony ................... 379/93 |
| 5,703,869 A | 12/1997 | Takase et al. ................ 370/229 |
| 5,745,167 A | 4/1998 | Kageyu et al. ............. 348/153 |
| 5,748,234 A | 5/1998 | Lippincott ................. 348/222 |
| 5,754,227 A | 5/1998 | Fukuoka .................... 348/232 |
| 5,757,094 A | 5/1998 | Goettsch ................ 395/200.34 |
| 5,761,329 A | 6/1998 | Chen et al. |
| 5,764,286 A | 6/1998 | Kawamura et al. ......... 348/232 |
| 5,784,099 A | 7/1998 | Lippincott ................. 348/222 |
| 5,786,851 A | 7/1998 | Kondo et al. ............... 348/222 |
| 5,790,181 A | 8/1998 | Chahl et al. ............. 348/36 |
| 5,793,290 A | 8/1998 | Eagleson et al. ........... 340/573 |
| 5,805,214 A | 9/1998 | Nishizawa et al. ......... 348/231 |
| 5,822,537 A | 10/1998 | Katseff et al. ......... 395/200.61 |
| 5,825,432 A | 10/1998 | Yonezawa ................... 348/563 |
| 5,831,669 A | 11/1998 | Adrain ....................... 348/143 |
| 5,835,613 A | 11/1998 | Breed et al. ............... 382/100 |
| 5,857,190 A | 1/1999 | Brown ........................ 707/10 |
| 5,859,835 A | 1/1999 | Varma et al. ............... 370/229 |
| 5,862,342 A | 1/1999 | Winter et al. .......... 395/100.61 |
| 5,870,139 A | 2/1999 | Cooper et al. ............. 348/159 |
| 5,870,148 A | 2/1999 | Lillevold .................... 348/415 |
| 5,875,305 A | 2/1999 | Winter et al. .......... 395/200.61 |
| 5,880,784 A | 3/1999 | Lillevold ................... 348/404 |
| 5,886,732 A | 3/1999 | Humpleman ................. 348/10 |
| 5,901,138 A | 5/1999 | Bader et al. ................ 370/229 |
| 5,969,755 A * | 10/1999 | Courtney .................... 348/143 |
| 6,069,655 A * | 5/2000 | Seeley et al. ............... 348/154 |
| 6,081,606 A * | 6/2000 | Hansen et al. ............. 382/107 |
| 6,128,398 A | 10/2000 | Kuperstein et al. |
| 6,157,871 A | 12/2000 | Terranova |
| 6,166,729 A * | 12/2000 | Acosta et al. ............... 715/719 |
| 6,233,428 B1 * | 5/2001 | Fryer ......................... 434/308 |

* cited by examiner

NETWORKED DIGITAL SECURITY SYSTEM AND METHODS

FIELD OF THE INVENTION

The present invention relates to networked digital security systems and methods.

BACKGROUND OF THE INVENTION

While digital security systems have been disclosed (see, e.g., U.S. Pat. No. 5,875,305 to Winter et. al, U.S. Pat. No. 5,625,410 to Washino, and U.S. Pat. No. 5,689,442 to Swanson), present digital security systems do not fully take advantage of the significant intelligence possibilities offered by digital cameras, programmable digital signal processors, and programmable communications processors. Nor do the present systems offer a fully integrated networked digital security system including a centralized web server that allows for authentication and access control to digital security services, remote configuration of intelligent camera units and customer servers, and significant administrative and billing functions via the Internet.

SUMMARY OF THE INVENTION

According to one embodiment, the present invention relates to a digital security system comprising: at least one camera unit for capturing and transmitting frames of video and/or audio signals over a communications network; at least one customer server coupled to the camera unit via the communications network; at least one customer work station coupled to the customer server via the communications network; an administrator server coupled to the at least one client server via the communications network; and authentication means at the administrator server for authenticating a customer at the at least one customer work station so as to allow the work station to receive the video and/or audio signals transmitted by the at least one camera unit.

In one mode, the camera unit preferably transmits video and/or audio signals over the communications network only after detecting a predefined event. The camera unit also preferably transmits video and/or audio signals over the communications network in response to receiving a command from a user at the customer work station or an administrator work station.

The camera unit preferably tags the frames of video and/or audio signals based upon detecting one of a plurality of predefined events, and also transmits an event packet upon detecting a predefined event. The camera unit preferably tags the frames of video and/or audio signals by inserting information in the header of the transmitted frames that identifies the predefined event. Similarly, the event packet preferably includes information in the header of the event packet that identifies the predefined event.

The camera unit is preferably programmable to transmit either a snap shot or an event clip upon detecting a predefined event. The camera units are also preferably programmable to simultaneously transmit both a snap shot and an event clip upon detecting a predefined event.

The camera unit is also preferably programmable to detect different predefined events based on the time of day. The camera units may operate in a plurality of modes, and may be remotely configured to operate in one of the plurality of modes via, e.g., a customer work station.

The camera unit also preferably includes a glass break detector, wherein the glass break detector preferably includes: an audio input receiver means, a digital signal processor for computing spectrograms of incoming audio signals, and a means for comparing a predefined glass break spectrogram template against the spectrograms computed by the digital signal processor.

The camera unit also preferably includes a motion detector that analyzes the video signals captured by the camera unit, wherein the motion detector preferably comprises a digital signal processor that includes an automatic learn component that automatically updates a stored background image against which the digital signal processor performs motion analysis detection.

The camera unit preferably increases one or more of the bit rate, pixel coding depth, the image size, frame rate, and compression algorithm associated with the video signals in response to detecting motion in the video signals or other certain predefined events. The camera unit also preferably includes an object detector and an object speed detector, and is preferably capable of transmitting an appropriate event packet over the network based on the speed of the detected object. The camera unit also preferably includes an object movement detector that detects the direction of movement of a detected object, and preferably determines whether to transmit an event packet over the network based on what direction the detected object is moving.

The authentication means of the administrator server preferably includes means to compare inputted user identification information against a database of monitored sites to which the user may access.

The administrator server also preferably receives the event packets and associated video and/or audio information, and intelligently routes the packets and information to one or more administrator work stations. The administrator server also preferably includes means for receiving event packet information from the camera units, and means for transmitting relevant contact information to one or more administrator work stations.

The administrator server also preferably includes means for receiving the event packet information from a camera unit and means for automatically contacting one or more of the local police, local fire department, and customer contact.

The camera unit also preferably includes a camera system; an encoder coupled to the camera system that encodes the video signals transmitted by the camera system; and an automatic gain controller coupled to the camera system and the encoder, the automatic gain controller receiving mean, maximum, and minimum intensity video signal values from the camera system, and variance and delta values from the encoder, and providing in response a control signal that controls the gain of the camera system so that the camera unit transmits video signals with substantially constant image luminance for varying lighting conditions.

The camera unit also preferably includes the camera system; an encoder coupled to the camera system that encodes the video signals transmitted by the camera unit; an encoder buffer coupled to the encoder; and an encoder buffer controller coupled to the camera system and the encoder buffer, the encoder buffer controller receiving as inputs an in buffer bit rate input from the encoder, and an out buffer bit rate from the encoder buffer.

The camera unit also preferably includes a network bandwidth controller that adjusts the signal transmission delay of the camera unit as a function of a network collision rate and the priority of the camera unit. The camera unit preferably autonomously determines its priority based on the type of predefined event it is experiencing.

The camera units are preferably coupled to conventional sensors, and are configured to receive an alarm signal from the conventional sensors, and to transmit appropriate event packets over the network in response to receiving the alarm signals from the conventional sensors. The camera units may, depending on the detected event, start transmitting video and/or audio signals in response to receiving alarm signals from conventional sensors. The camera units may also change a characteristic of transmitted video and/or audio signals in response to receiving alarm signals from the conventional sensors.

The camera units may perform boolean analysis of alarm signals sent by the various conventional sensors and events detected by the camera unit before transmitting an event packet over the network.

The camera unit is preferably configured to simultaneously transmit video signals in more than one compression algorithm standard format in response to detecting certain predefined events. For example, a camera unit may simultaneously transmit video signals according to the JPEG format and the H.263 format in response to detecting certain predefined events. The camera units are also preferably configured to simultaneously transmit video signals having differing bit rates, frame rates, image sizes, and pixel coding depths.

A graphical user interface is preferably provided at the administrator and/or customer workstations such that the graphical user interface schematically displays event durations for a plurality of camera units. The video or audio information schematically represented by the event duration display is preferably accessible by a user clicking on the event duration display.

The customer and administrator work stations preferably include a multi-algorithm reader that allows the work stations to display successive frames of video signals encoded in different compression algorithm standard formats.

These and many other features of the present invention will be better understood after reading the remainder of this application.

DETAILED DESCRIPTION OF THE PREFERRED EMBODIMENTS

The networked digital security system of the present invention provides an intelligent security service to a plurality of customers at a plurality of monitored sites that are remote from a centralized administrator web server. As will be discussed in detail below, the centralized web server advantageously acts as a point of control for management of the monitored sites including: access and authentication control; configuration of customer servers and camera units at the monitored sites; handling of and storage of video, audio, and associated alarm event information transmitted by the camera units at the monitored sites; and several administrative and billing functions.

Figure 1:
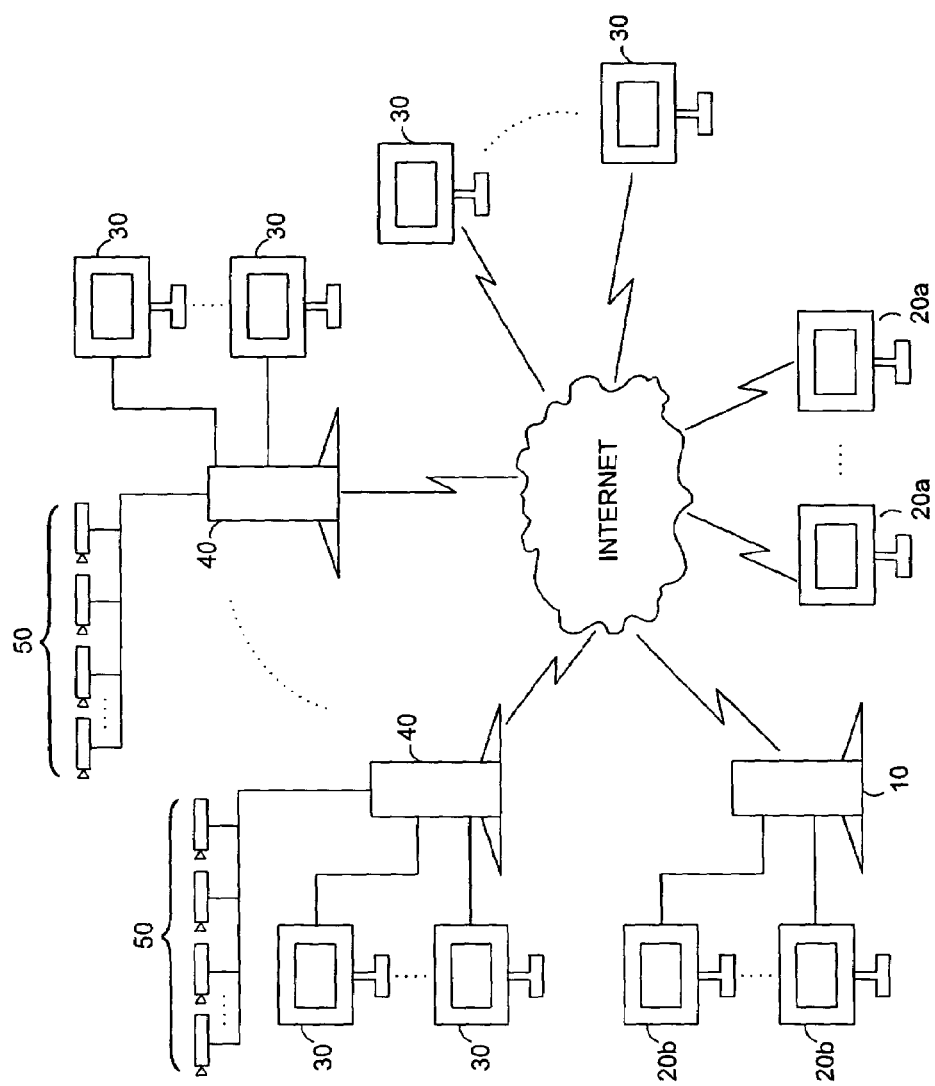
FIG. 1 is an illustrative block diagram of the system of the present invention.

FIG. 1 shows a system diagram of the present invention. A centralized administrator web server 10 is coupled via a communication network such as the Internet 100 to a plurality of administrator work stations 20, a plurality of customer servers 40 and a plurality of customer work stations 30. The customer servers 40 are preferably located at the customer's monitored sites. Camera units 50 are preferably fully integrated intelligent units that gather, analyze, and transmit video, audio, and associated alarm event information to their associated customer server 40 and on to the administrator web server 10. The information transmitted by the camera units is also accessible to an authorized user at a customer work station 30 and administrator employees at administrator work stations 20 via the servers. The camera units will be discussed in detail below. The customer work stations 30 may be coupled to customer servers 40 via a local area network, a global area network such as the Internet 100, or some combination thereof as is illustrated in FIG. 1.

While only a couple of customer servers 40 and customer work stations 30 are shown in FIG. 1, it will be understood that the system is capable of servicing many more customer servers and customer work stations, which may be located throughout the United States and elsewhere. The customers may include any person or entity that subscribes to the security services offered by the administrator, and may include, e.g., individual residences, schools, stores, banks, museums, etc.

One or more administrator work stations 20 are also coupled to administrator server 10 via a local area network, a global area network such as the Internet 100, or some combination thereof, as illustrated by administrator work stations 20a and 20b. There may be many more administrator work stations 20 than are shown in FIG. 1. The administrator work stations are utilized by administrator employees to monitor the customer sites, retrieve stored video, audio, and event information, and configure camera units 50 and customer servers 40.

Figure 2:
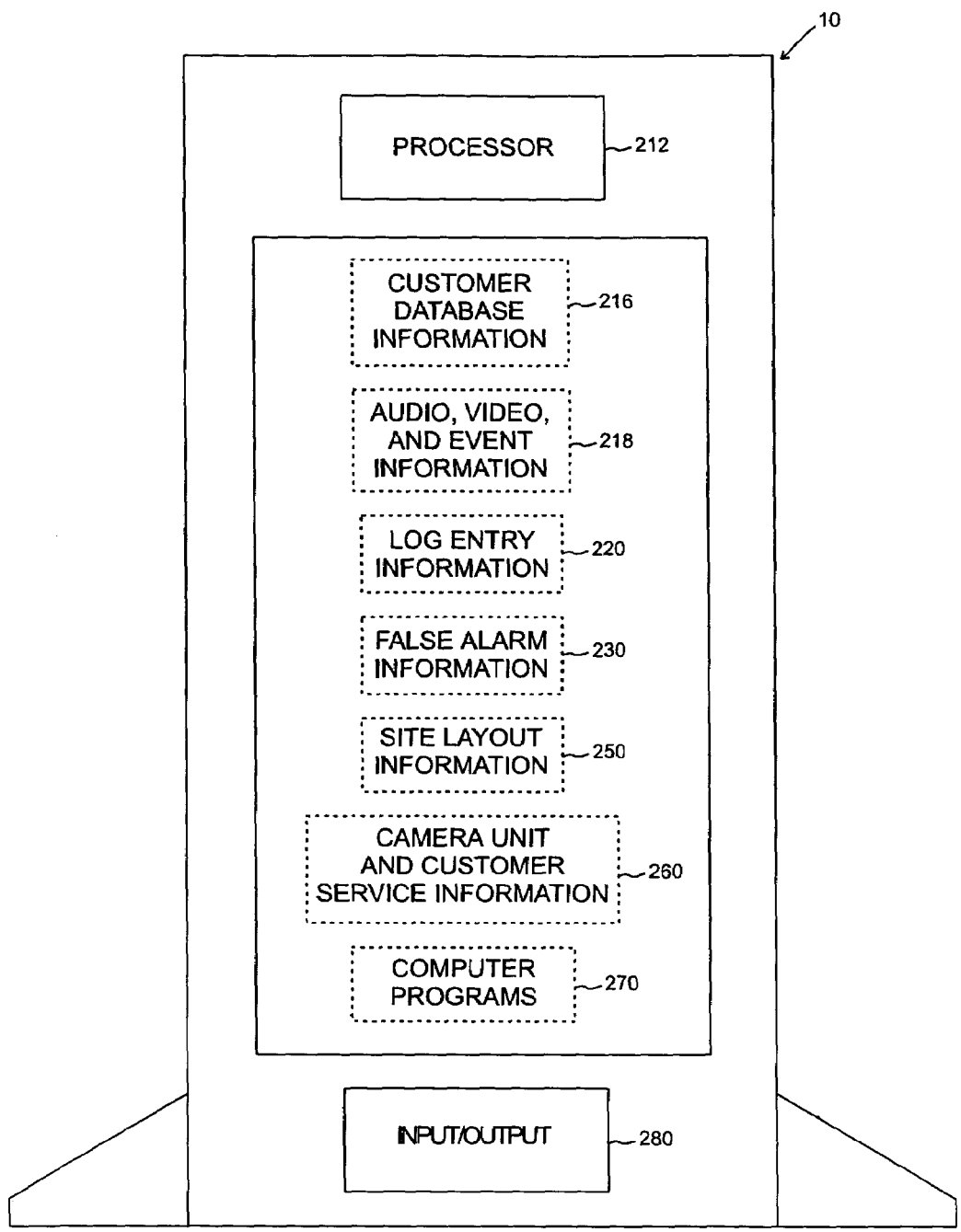
FIG. 2 is a schematic representation of the administrator web server.

Administrator server 10 preferably is a programmed general purpose computer that includes (as schematically represented in FIG. 2) a processor 212, memory 214, and input/output means 280.

Memory 14 stores customer information 216; audio, video, and event information 218; log entry information 220; false alarm information 230; monitored site layout information 250; camera unit and customer server information 260; and computer programs 260 that run the administrator server in accordance with the present invention.

The stored customer information 216 preferably includes for each customer: system identification number (user id); a password; information concerning the monitored sites that the customer may access from a customer work station; and information concerning the configuration options that the customer may access for each monitored site. The audio, video, and event database information 218 includes the stored audio, video, and event information that has been transmitted to the administrator server from the camera units 50. False alarm information 230 includes information relating to false alarms. The monitored site layout information 250 preferably includes information relating to the layout of each monitored site, and the positioning of the camera units at each monitored site. This information is manually inputted by an administrator employee. Camera unit and customer server information 260 includes information relating to the camera units including the location of each camera unit and customer server and relevant contact information relating to each camera unit.

The input/output means 216 includes the web site of the present invention. As is well known, however, a separate web server may be utilized to host the web site of the present invention, with the database information stored in memory 14 contained in a database server coupled to the web server via a local area network, or any other communication network.

As mentioned above, the administrator web server 10, among other things, advantageously controls customer access to the security services offered by the present invention by requiring a customer at a customer work station 30 to log into the administrator server 10 before he may: access any information transmitted by the camera units 50 associated with his monitored site(s); access information stored at customer servers 40 associated with his monitored site(s); or configure any customer servers 40 or camera units 50 associated with his monitored site(s). That is, no request for services is honored by a customer server 40 unless the session is originated by the administrator web server 10. As such, the customer servers are not directly accessible from any customer work station.

Figure 3:
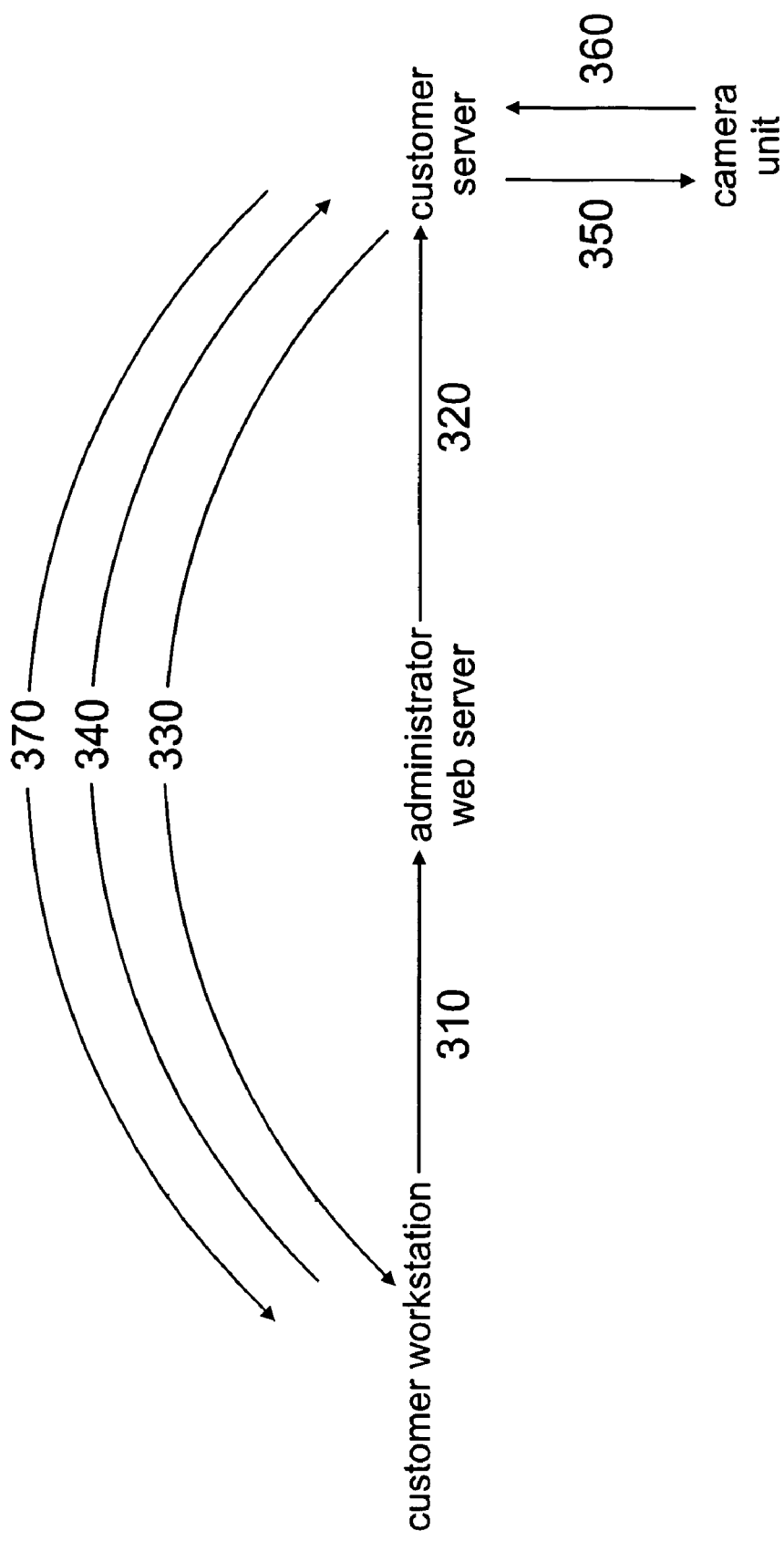
FIG. 3 depicts the process by which the administrator web server controls access to customer servers and camera units.

This authentication and control process is schematically illustrated in FIG. 3. At step 310, a customer at a customer work station attempts to log into the administrator web server by preferably entering previously issued user identification and password information. (Of course, any log-in procedure that authenticates a user may be used.) If the inputted user identification and password are accepted by the administrator server, the administrator server 10 then provides access on the customer work station 30 only to those monitored sites that are associated with the inputted user identification in customer database 216 in the administrator server 10. In addition, whether the customer will have access to any of the available customer server 40 and camera unit 50 configuration options via an user interface at the customer work station 30 is also determined and controlled by the administrator server 10 at this time by comparing the inputted user identification with the customer database information 216.

If the customer selects via the user interface at customer work station 30 a monitored site associated with a particular customer server, the administrator web server starts a session between the customer work station and the particular customer server (steps 320 and 330). Once the session is initiated, the customer server opens up channels to the customer work station: one or more channels for commands and events, and channels for audio and video information. Once the session is established, the customer work station may communicate directly with the customer server, e.g., by instructing (step 340) the customer server to display (steps 350–370) live video from a particular camera unit.

The customer servers 40 capture the information transmitted by their associated camera units 50, store information transmitted by the camera units, and service retrieval requests for video and audio information and event data. The customer servers are also capable of controlling the configuration of their associated camera units 50 under the control of an authorized customer at a customer work station 30. For example, the customer servers 40 may remotely and individually configure each camera unit 50 to detect one or more alarm events. The alarm events that may be detected by the internal circuitry of camera units 50 at least include: 1) no event; 2) glass break, scream, and gunshot detection; 3) detection of motion and rapid changes in motion; 4) the opening or closing of a door or window; 5) detection of rapid, dramatic changes in ambient light levels; and 6) other video and audio content changes or characteristics. Camera units 50 may also be coupled to any number of conventional sensors such as contact sensors for doors and windows, motion detectors, glass break detectors, panic buttons, temperature sensors, smoke sensors, etc. Whether the camera units will transmit alarm events based on receiving alarm signals from these conventional sensors may be remotely and individually configured via the customer servers.

Under the control of an authorized customer at a customer work station 30, the customer servers can also control the alarm state of each of its associated camera units 50. The states include alarm off (e.g., during business hours), and alarm on (e.g., after business hours). The customer servers 40 may also configure the operation mode of each of their associated camera units 50. The operation modes include: 1) quiet mode; 2) live viewing mode; and 3) event detection mode.

In the quiet mode, preferably the default state of the camera units 50, a specified camera unit buffer continually receives video and/or audio information and stores it to a rolling buffer. It does not, however, transmit the information to the customer and administrator servers.

In the live viewing mode, a specified camera unit transmits video and/or audio information over the network to its customer server. The customer server then provides the video and/or audio information to either a customer work station or an administrator work station when prompted to do so by a user at one of the work stations. The camera unit continues to transmit the information until the user transmits an instruction to stop. The live viewing mode can be used at any time regardless of the alarm state (alarm on/off) or whether an event is occurring. Moreover, there should be relatively little delay in displaying the information on the work station because the video transmitted to the network is a pass-through of the video information, rather than a slightly delayed post-buffer transmission. The live viewing mode allows store owners, managers, etc. to view their monitored sites at anytime.

In event detection mode, a camera unit transmits video and/or audio information to its associated customer server and to the administrator web server when it detects the occurrence of an event.

It is important to recognize that the camera unit operation modes are independent of the alarm state (alarm on/off). Any camera unit can be in any of the operation modes regardless of whether the alarm state is on or off. In addition, live viewing mode and event detection mode can be active simultaneously for a given camera unit. That is, the camera units are capable of handling and transmitting an event while in the live viewing mode.

The type of transmission that a camera unit provides over the network upon detecting predefined events may also be individually, remotely configured. For example, for certain predefined events, a camera unit 50 may be individually, remotely configured by a customer work station 30 to transmit a relatively high resolution picture (e.g., by increasing the pixel coding depth for the frame) over the network, a snap shot. The camera unit may also increase the pixel coding depth. For other predefined events, a camera unit may be individually, remotely configured to transmit a length of video and/or audio bounded by the duration of the event, an event clip. As will be seen below, a camera unit 50 may also be individually, remotely configured to simultaneously transmit both a snap shot and an event clip upon detecting certain predefined events.

As will be discussed in more detail below, the camera units may also be individually, remotely configured to detect different events based on the time of day. That is, the camera units may be programmed such that certain detected activity triggers an alarm event only during programmed periods of time during the day. Moreover, the camera units 50 may be individually, remotely configured to have different event detection mode settings for different alarm states. For example, a camera unit 50 can be configured for snap shots during alarm on times and event clip during alarm off times. Illustratively, a lobby camera unit 50 could be configured to transmit only a snap shot of every person entering the building during the day (alarm off), while configured to transmit event clips during the night (alarm on) so as to capture the actions of an intruder for the duration that he is in the camera unit's field of view.

When a camera unit 50 is configured for snapshot and an event occurs, the camera unit will transmit event data describing the event (preferably coded header information that describes the event) and one or more tagged images to its associated customer server and to the administrator server. The servers then translate the event data into SQL commands for storage. These images are preferably relatively high resolution JPEG images. The number of images transmitted per event is also individually, remotely configurable.

When a camera unit 50 is configured for event clip and an event occurs, the camera unit will transmit to the customer and administrator servers: event data, tagged buffered video and/or audio information captured up to the event detection, and tagged live video from event detection until the event ends. The length of buffered video and/or audio sent as part of the event video clip is individually, remotely configurable. This setting option may, however, be limited by the amount of memory in the camera unit. The presently preferred embodiment allows the camera unit to buffer 80 seconds of video at 384 kbps (CIF resolution, 15 frames per second) prior to an event, by providing 4M of DRAM. This memory is of course expandable.

Under the control of an authorized customer at a customer work station 30, a customer server may also configure the frame rate, the bit rate, pixel coding depth, and the size (for video) of the video and/or audio information transmitted by its associated camera units, as well as the compression algorithms used by its associated camera units. Moreover, the parameters for adjusting any of the bit rate, pixel coding depth, frame rate, size, and compression algorithm used by the camera units upon detecting predefined events are also individually, remotely configurable. For example, the parameters for adjusting the frame rate upon detecting rapid, dramatic changes in ambient light level are configurable via the customer server.

Figure 12:
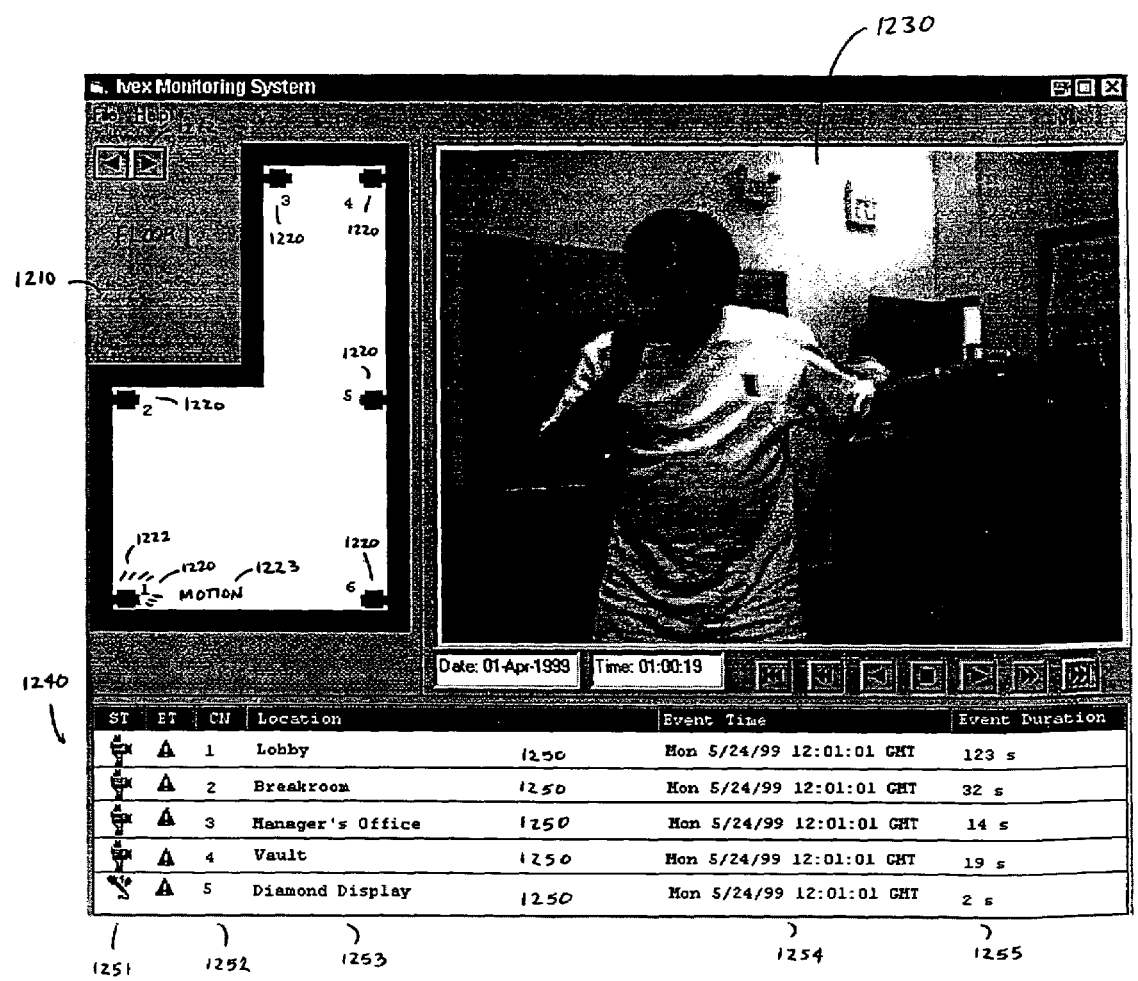
FIG. 12 is an illustrative viewer user interface page.

Finally, an authorized customer can specify the time frame used to display event lists in the view function on the user interface to be described below in connection with FIG. 12. For example, the user may specify that all events less than N minutes or hours old will be displayed on the event list.

The customer servers 40 also include memory. The memory allows video and audio information transmitted by associated camera units to be saved to a hard drive at the customer servers. This information is preferably accessible on-line. The video is preferably recorded at 384 Kbps. The video and/or audio that is recorded varies depending on the mode a particular camera unit is in and how the camera unit has been configured. The customer server 40 is capable of recording at variable bit rates as configured by an authorized customer at a customer work station. The presently contemplated preferred variable bit range is 20 Kbps–10 Mbps. An authorized customer at a customer work station 30 can also transmit instructions to a customer server 40 to start or stop recording.

The customer server 40 also includes memory for archival purposes. This allows the audio and video data to be saved to media such as DVD RAM or DAT tape for long term storage. This data is preferably not available on-line. If an event occurs while video is being archived, the customer server will stop archiving. Once the event ends, it will automatically continue the archiving at the point where it stopped. A customer at a customer work station may also configure the system to automatically archive video and audio information. Moreover, whether such video and audio information is automatically archived can be configured by the customer based on the different camera unit and alarm state settings described above.

A record capability may also be provided at customer work stations 30. If it is provided, the customer can select via a user interface: 1) what (if anything) will be recorded at the customer work station; 2) when it will record (e.g., day and time, independent of camera unit mode or event state); 3) how long it will record; and 4) the quality level (e.g., bit rate or frame rate). The customer may specify different recording configurations for each of the two alarm states (alarm on and alarm off), and also has the option of initiating recording manually via the user interface.

An archiving capability may also be provided at customer work stations 30. If it is provided, the customer can select via a user interface: 1) what (if anything) will be archived at the customer work station; 2) when it will be archived (e.g., day and time, independent of camera unit mode or event state); 3) how long it will be stored; and 4) the quality level (e.g., bit rate or frame rate). The customer may specify different archiving configurations for each of the two alarm states (alarm on and alarm off), and also has the option of initiating archiving manually.

In addition to the authentication and access control function described above, the centralized administrator web server 10 also allows for the configuration of customer servers 40 and camera units 50 via administrator work stations 20; handles, routes, and stores the video, audio, and associated alarm event information transmitted by the camera units at the monitored sites; and provides several administrative and billing functions.

The camera units 50 can be configured via the administrator work stations 20 in the same fashion as described above in connection with customer work station control of the configuration of the camera units. The recording and archival features of the customer servers 40 can also be configured via the administrator web server in a manner similar to that described above in connection with the customer servers. The site floor plans for the site(s) associated with each particular customer server may also be configured and updated as necessary via the administrator work stations. The rate at which video is transmitted from a customer server to a given customer work station is also configurable. General system diagnostics, and other customer server updates may also be performed remotely via the administrator web server.

The administrator server 10 also receives the audio, video, and event information transmitted by the camera units, preferably stores the information for both on-line and off-line storage in a manner similar to that described in connection with the customer servers, and intelligently routes the information received from the camera units to specific administrator work stations 20 so that the sites may be monitored by administrator employees.

The administrator server 10 also preferably includes a computer program that matches event data received from a particular camera unit 50 to relevant telephone numbers (or other contact information such as but not limited to pager numbers, e-mail addresses, and other contact information) related to that camera unit's monitored site that is preferably stored in camera unit database 260. The matching process may also depend on which predefined event is received by the administrator server from a particular camera unit. For example, upon receiving a glass break event from a particular camera, the administrator server may be programmed to place phone calls and play a prerecorded message to one or more of the local police, the local fire department, the local ambulance service, or the designated customer contact(s). On the other hand, upon receiving an event relating to a dramatic change in light for a particular camera unit, the administrator server may or may not place any phone calls or make in any contacts via the contact information discussed above. A customized matching process may be provided for each customer site, or even each camera unit.

Alternatively, the administrator may include a computer program that matches event data sent from a particular camera unit to relevant telephone numbers relating to that camera unit's site but does not automatically make any phone calls or otherwise try to contact the relevant entities described above. In this case, when event data is received by the administrator server from a particular camera unit, the administrator server causes relevant telephone number or other contact information to be displayed on one or more specified administrator work stations 20. The relevant contact information may include contact information for the local police, local fire department, ambulance service, and the customer. The administrator employee could then analyze the event, including reviewing any relevant video and/or audio information, and make the decision as to who should be contacted.

The administrator server 10 also provides administrative and billing functions. Specifically, it preferably maintains false alarm information 230 that maintains for each camera unit: where the camera unit is located; the types of alarm events transmitted by the camera unit and when they were transmitted; and whether the alarm events were false alarms. Information regarding false alarms for each of the camera units may be entered into false alarm database information 230 of the administrator server 10 by an administrator employee.

The computer processor 212 operating under the control of computer programs 270 of the administrator server 10 periodically computes the percentage of false alarms for each monitored site, each camera unit, and each event type for each camera unit and stores this information in the false alarm information database 230. This information is available via an user interface to administrator employees at administrator work stations 20. In this way, an administrator employee may view the false alarm information, analyze any associated video and/or audio information, and determine whether any of the camera units need to be re-programmed in a way to reduce false alarms. For example, a particular camera unit may have transmitted several false alarms for motion detection that only related to a tree blowing in the background. The administrator employee may view the false alarm information, analyze the associated video information, and remotely configure the camera unit to either change a region of interest for motion detection and/or increase the amount of motion that must be detected by the camera unit before it transmits a motion detection alarm event.

The alarm information computed by the administrator server may also be used to provide a variable rate billing service based on the number of alarms and the number of false alarms.

The customer servers 40 and administrator server 10 also maintain log entry storage information 220 regarding which customer and administrator work stations are viewing specific video and audio information over the system, and for how long. This information may also be used for billing purposes.

Figure 4:
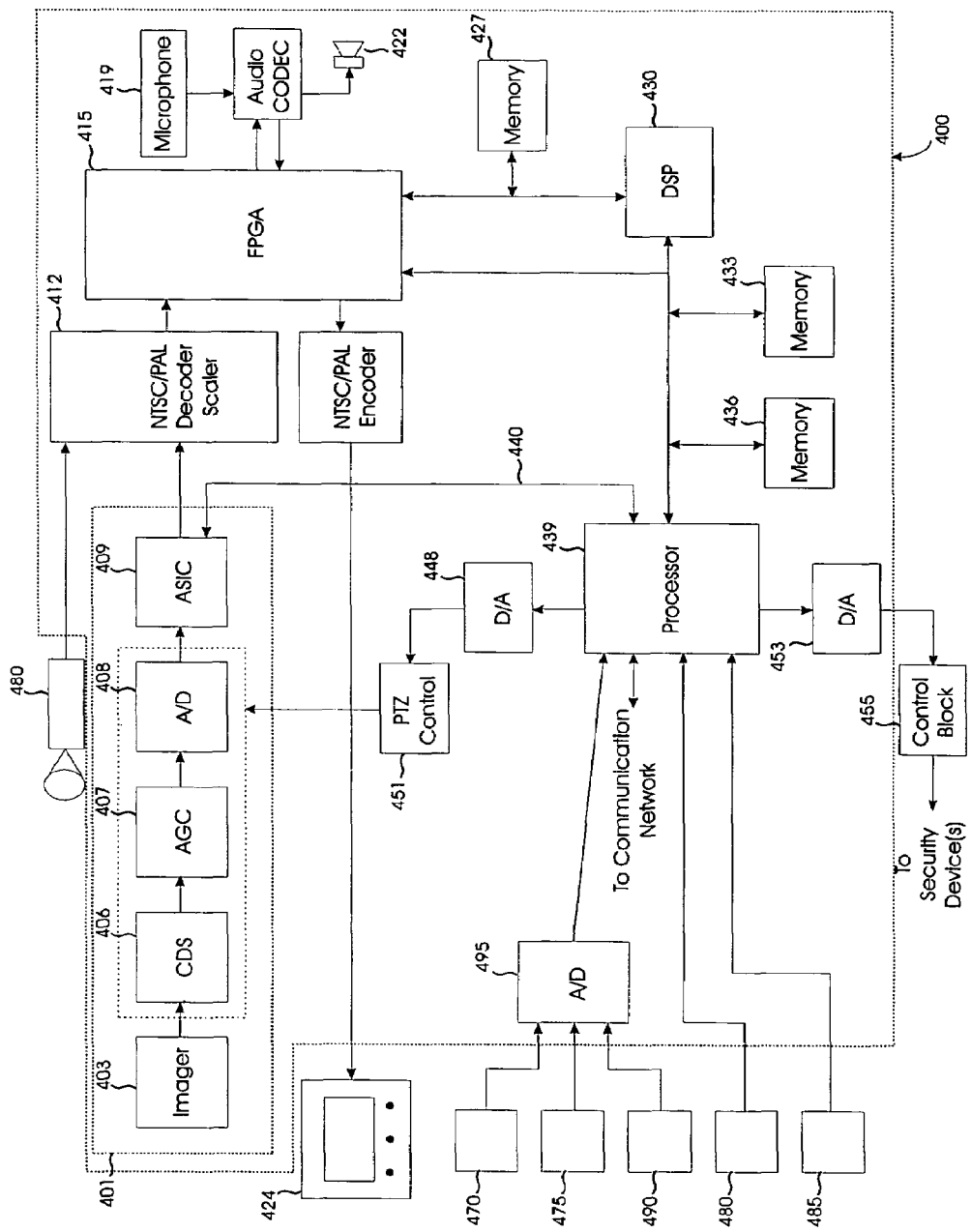
FIG. 4 is a block diagram of the intelligent camera unit of the present invention.

The camera units will now be described in connection with FIG. 4. As is shown, each camera unit 400 advantageously includes a digital camera system 401, decoder/scaler 412, FPGA 415, audio CODEC block 418, microphone 419, audio speaker 422, a digital signal processor (DSP) 430, a processor 439, storage means 427, 433, and 436, digital-to-analog converter 448, pan/tilt/zoom control 451, digital-to-analog converter 453, and analog-to-digital converter 495. FIG. 4 also shows a conventional analog camera 480, display 424, control block 455, and conventional alarm glass break sensor 470, convention alarm motion detection sensor 475, conventional alarm contact sensor 480, conventional alarm panic button sensor 485, and other conventional alarm sensors 490 such as heat detectors and smoke detectors.

The digital camera system 401 preferably includes a CCD or CMOS imager 403 which converts photons to voltage so to provide an analog video signal to a correlated double sampler 406. As is well known, the correlated double sampler (CDS) samples the incoming analog video signals twice for each pixel duration so as to remove noise. The CDS then transmits the sampled video signals to an automatic gain controller 407. The video signal is then transmitted to an analog-to-digital converter (A/D) 408 that converts each sample of the video signal into digital pixel data that is preferably 10 bits long. (The dashed lines surrounding CDS block 406, AGC block 407, and A/D converter 408 indicate that these blocks are preferably provided by one chip.) The digital pixel data is then received by an ASIC 409 that converts the pixel data into a standards compliant video stream, preferably the CCIR601 standard. A CCIR601 video stream includes a 8 bit luminance signal word Y, and two 8 bit chrominance signal words (Cr and Cb).

Block 412 depicts a NTSC/PAL decoder and a scaler. The NTSC/PAL decoder converts NTSC/PAL analog data received from the optional external analog camera 480 into the preferred CCIR601 standard compliant video stream. The scaler may adjust the image size of the video stream output by ASIC 409.

Field programmable gate array (FPGA) 415 includes a video signal operation component and an audio signal operation component. The video signal component of FPGA 415 demultiplexes the 8 bit video input into separate 32 bit YUV data for use by the encoders in DSP block 430. The video component also multiplexes 32 bit YUV data from the decoders in DSP block 430 into 8 bit video output for display on external monitor 424.

The audio signal component of FPGA 415 multiplexes and demultiplexes serial audio data (preferably complying with the AC97 standard) from the audio CODEC block 418, and sends pulse code modulated audio data to the DSP block 430. It also sends commands to processor 439 regarding volume, sample rate, and other control signals relating to the audio signals. The audio CODEC block 418 digitizes analog data received from microphone 419 into serial data streams and provides the streams to FPGA 415; it also converts digital audio signals to analog audio signals for transmission to speaker 422.

The DPS block 430, among other things, provides several compression/decompression algorithms for video (e.g., H.263, JPEG, Wavelets, MPEG-1, MPEG-2, MPEG-4, MPEG-7, etc.) and audio (G.711,G.723,G.729,etc.) so as to compress and decompress video and audio information transmitted to and received from processor 439. Processor 439 is the main processor for each camera unit. It makes decisions, interacts with the customer server, and provides for master timing control of the video and audio information processed by the camera units. This control includes controlling pan/tilt/zoom (PTZ) functions of the camera system 401 via D/A block 448 and PTZ control block 451. Storage means 436 stores the computer programs of the present invention that are accessed by the processor 439 and DSP block 430, while storage means 427 and 433, respectively, provide working DRAM memory for the DSP block and processor 439.

As discussed above, the camera units 400 capture video and audio information, analyze the information, and transmit event data based on the analysis of the video and audio information. Specifically, the internal circuitry in the camera units allow the units to at least detect the following events: 1) no event; 2) motion detection and rapid changes in motion; 3) glass breaking, scream, and gunshot; 4) the opening or closing of a door or window; 5) dramatic changes in light levels; and 6) other video and audio content characteristics and changes. Advantageously, the camera units are capable of detecting and transmitting multiple, distinct alarm events simultaneously. The camera units may also be coupled to the conventional sensors described above so as to receive alarm signals from the sensors and detect alarm events associated with the conventional sensors as well. When any of these events are detected, the camera units send an appropriate event packet (preferably coded header information describing the event) to the customer and administrator servers on a channel separate from the audio and video information channels, and send tagged snap shot and/or tagged event clip information to the customer and administrator servers on audio and video channels. In addition, an audio alarm may be generated at the camera unit based on the detection of certain pre-defined events.

Also as discussed above, the camera units 400 are individually, remotely configurable via the customer work stations 30 and the administrator work stations 20 to detect one or more of the above events, and to change various characteristics of the transmitted audio and video information based on detecting the events. That is, based on the type of event detected, the camera units can autonomously change one or more of the following variables: the bit rate, pixel coding depth (i.e., the number of bits utilized to code a pixel), frame rate, image size (video only), and compression algorithm. Based on certain predefined events, processor 439 of the camera units may also automatically control a pan/tilt/zoom (PTZ) control of the camera unit via D/A block 448 and PTZ control block 451. The event detection analysis in the camera units will now be described.

The DSP block 430 performs motion detection analysis by computing and analyzing the motion vectors associated with successive frames of video signals. The DSP may perform the motion detection analysis for specific predefined regions of interest within a particular camera unit's field of view as determined by software running on processor 439 for that particular camera unit; alternatively, the region(s) of interest may be a command from a user at either of a customer work station or an administrator work station. Each camera unit is capable of simultaneously analyzing several different regions of interest, which may by irregularly shaped and overlapping with other regions of interest.

If a predetermined threshold of movement is determined by the DSP 430 within a specified region of interest, it sends an interrupt signal to the processor 439. The processor 439 then sends an event packet describing the event to its associated customer server and the administrator server.

If motion has been detected, processor 439 also preferably increases the frame rate of the incoming video signal. The frame rate is controlled by changing the pixel clock and frame rate integration clock received as inputs at imager 403. This will provide for higher quality video. The bit rate, pixel coding depth, image size, and compression algorithm may also be automatically changed by processor 439 of the camera units based on a motion detection event.

The camera units advantageously implement an auto-learn component that allows each camera to sense its environment and self-calibrate a background image against which it preferably performs its motion detection analysis. The auto-learn component operates as follows. When a camera unit is first installed, a background scene is collected by the camera unit and stored in storage block 427. Based on the application and environment of the camera unit, the camera unit senses movement in the scene during a pre-defined time interval and references it to the stored background. If the change in the scene is constant for a predetermined amount of time (e.g., leaves blowing in a tree, a flag flying on a flag pole, or a new object that has been brought into the camera's field of view), a new background scene will be stored in storage block 427. These objects and motion fields will then be ignored by the camera unit when it is performing its motion detection analysis. This results in less false alarms. Moreover, because of the auto-learn feature, the camera units may be installed for operation at the site without any involved manual calibration procedure.

The DSP block 430 also calculates the frequency content of each frame, and transmits this data to processor 439. Based on the frequency content data, the desired frame rate, and the available bandwidth over the network, processor 439 adjusts the input filtering of the incoming video by writing to registers in ASIC 409 to adjust the input video frequency to the encoder of DSP 430 to better match the desired bit rate. Adjusting the input video frequency smooths out the sharp edges in a particular image frame, and therefore reduces the bit rate.

The DSP block 430 also calculates the bit rate during the encoding process, and transmits this data to processor 439. Based on movement detected within a frame or region of interest and the size of a proposed target, the image size, bit rate, and pixel coding depth are preferably increased. The bit rate command is transmitted to the DSP 430, and the image size command is transmitted to the scaler in block 412 and the DSP 430, and the pixel coding depth command is transmitted to A/D 408 via ASIC 409 or via a direct coupling between processor 439 and A/D 408.

The camera unit also detects dramatic changes in ambient light (e.g., lights being turned on, or the camera unit being spray painted or covered.) A histogram accumulator associated with the camera system 401 accumulates on a frame by frame basis the maximum, minimum, and mean intensity levels of the video signals, and transmits this information to processor 439. If these levels increase or decrease dramatically, processor 439 sends an event packet to its associated customer server and the administrator web server. Control of the camera unit based on detecting changes in ambient light is discussed below in connection with the intelligent gain controller.

The camera units 400 also capture and analyze audio information for potential event information. Specifically, the camera units include glass break, gunshot, and scream detectors that are implemented in software. Audio signals are first captured by microphone 419 and digitized by block 418. The digital audio signals are then transmitted by the FPGA into DSP block storage means 427. Next, the DSP block 430 constructs a normalized spectrogram for the digital audio signals. Processor 439 then compares the normalized spectrogram against predetermined normalized spectrogram templates for the breaking of different types of glass and other window materials, typical gunshots, and screams. If sufficient correlation is detected between the frequency and amplitude of the normalized spectrogram and any of the predetermined normalized templates, the processor sends out the appropriate event information packet to its customer server and the administrator server. In addition, the camera units may be individually, remotely configured to start transmitting video and/or audio information based on detecting any of these audio events and/or autonomously change the above described characteristics of the transmitted video and audio.

As discussed above, the camera units may also be coupled to conventional detectors such as glass break sensors 470, motion detector sensors 475, door or window closure contact sensors 480, panic button sensors 485, and other conventional sensors 490 such as heat detectors and smoke detectors. Processor 439 is preferably coupled to one or more conventional glass break sensors 470, one or more motion detector sensors 475, and one or more heat or smoke detector sensors 490 via an analog-to-digital converter 495 since such sensors generally provide voltage signals as a function of the detected signal. Processor 439 may be directly coupled to door/window contact sensors and panic button sensors since such sensors generally are switch-based sensors that provide signals that are easily detected by processor 439. Processor 439 is thus capable of detecting signals sent by these conventional sensors, and in response, transmitting appropriate event information to its associated customer server and the administrator server. In addition, the camera units 400 may be individually, remotely programmed to automatically start transmitting video and audio information upon receipt of one or more of the conventional sensor alarms and/or autonomously change the above described characteristics of the transmitted audio and video signals.

The camera units 400 may also be individually, remotely programmed to perform boolean analysis of the signals received from the conventional sensors and the alarm events that the internal circuitry of the camera units are capable of detecting. For example, processor 439 of the camera units may be programmed to output event packet information only if motion is detected a predetermined time following or preceding receipt of an alarm signal from a conventional door/window contact sensor. Boolean analysis may be performed on any of the conventional sensor information received by the camera units and any of the event information internally detected by the camera units.

The camera units may also be individually, remotely configured to send signals to other security related devices responsive to detecting certain predefined events. As is shown in FIG. 4, processor 439 is preferably coupled to a digital-to-analog converter 453 in order to control circuitry associated with other security devices upon detecting certain predefined events. For example, responsive to detecting motion or the breaking of glass during non-working hours, the camera unit may send a control signal to a security device controlling a door. The security device responds to the camera unit's signal by locking the door, or disengaging key card or similar electronic access. In this way, even if an intruder has managed to enter one room of a monitored site, he may not easily enter another room. Responsive to other predefined events, the camera unit may send signals to make access easier. For example, if the camera unit detects a signal from a conventional heat sensor, it may send a signal to a control block controlling an exit door so as to automatically open the exit door. A camera unit may also be programmed to automatically open doors, gates, etc. upon detecting other predefined events. While only one control block 455 is shown in FIG. 4, it is understood that a camera unit may control several security related devices responsive to detecting predefined events.

The camera units are also individually, remotely programmable to open up a two way voice channel between the camera unit and a user at a customer and/or administrator work station responsive to detecting certain predefined events. The incoming audio is received by processor 439 and outputted on speaker 422 of FIG. 4, and the audio from the camera unit is received via microphone 419 and transmitted by processor 439.

Figure 5:
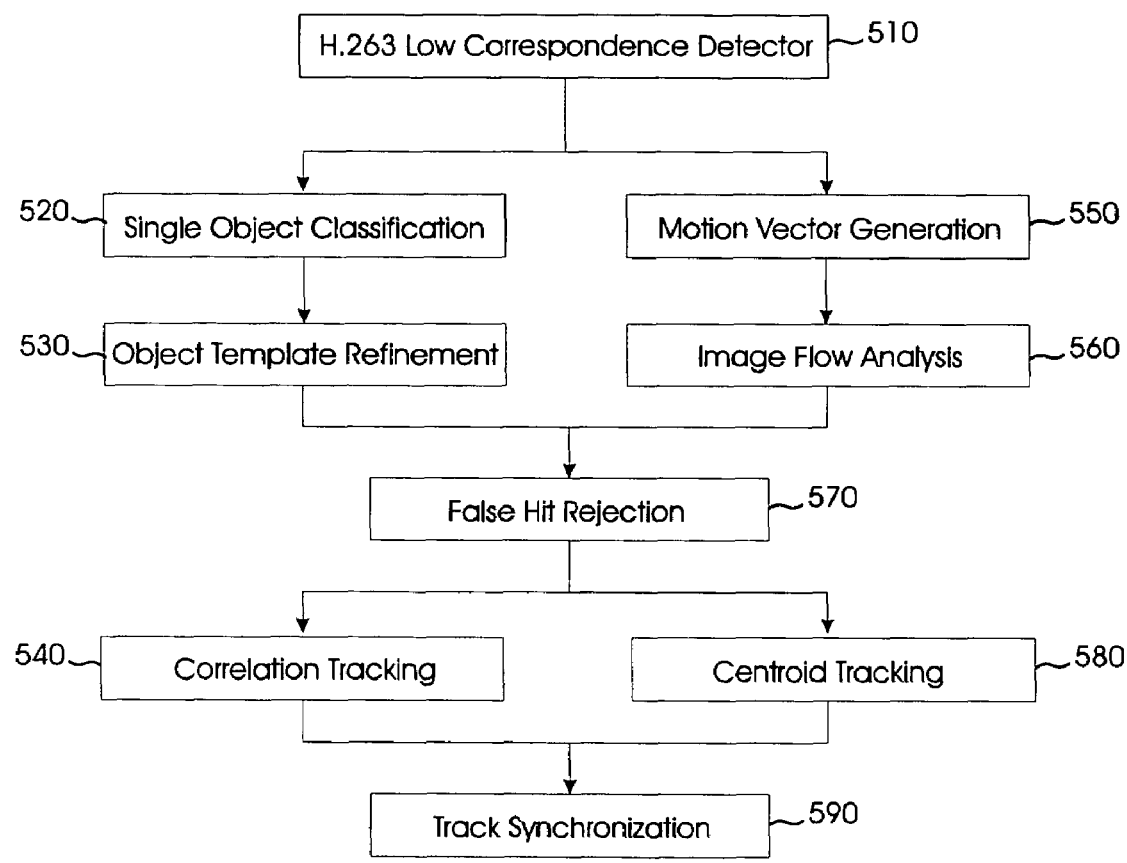
FIG. 5 depicts the object recognition and tracking algorithms of the present invention.

The camera units 400 also implement object recognition and tracking algorithms running on processor 439. These algorithms are depicted by the flowchart of FIG. 5. The object recognition algorithm generates a coarse object template by monitoring the encoder of DSP block 430. The areas of the image that display little correspondence between successive frames are recorded (see step 510), and a determination is made as to whether these constitute a single object (see step 520). The object recognition algorithm further refines the template by performing edge detection on a video frame in the neighborhood of the coarse template (see step 530). The resulting boundaries improve the template size and shape, and the updated template is used to perform correlation tracking 540.

A centroid tracking algorithm (580) is also implemented by generating motion vectors (step 550) and analyzing the image flow (560) in the vicinity of the low correspondence regions recorded by the low correspondence detector (510). The two tracking algorithms work in parallel and support each other to maintain a steady fix on the targets. A pattern matching algorithm (570) is employed to filter out false hits by matching the size and shape of the object template against predefined size and shape parameters. Tracking synchronization information 590 is transmitted to the pan/tilt/zoom control block 451 in order to track the detected object.

The camera units are also preferably capable of distinguishing between an object that is relevant to its monitored environment (e.g., an intruder walking down a hallway) and an irrelevant object (a mouse scurrying down the hallway).

This is accomplished by programming the processor 439 to classify the size of the detected object based upon the number of pixels the object fills in the camera's field of view. The camera units may be individually programmed via an authorized customer work station or an administrator work station to detect only certain sizes of objects based on its monitored environment and field of view.

In addition to detecting the relative size of a detected object, the camera units 400 are also capable of detecting the direction of a detected object's movement. This feature may be utilized to detect certain predefined events or to decide whether to provide a snap shot. For example, a camera unit may be installed opposite an entrance door to a room so that only objects moving into the room (as opposed to out of the room) are of interest in terms of detecting an event or transmitting a snap shot of the object. Once an object is detected by the camera unit, the object may be tracked frame to frame as discussed above in connection with the object recognition/tracking algorithm. Based on the direction of the motion vectors computed by the DSP block 430, the processor 439 can determine the object's direction of movement. Assuming the camera unit has been programmed to transmit an alarm based on, e.g., someone entering a room through a monitored doorway, the camera unit can transmit an appropriate event packet as well as the relevant video signal and motion vector information. In this way, the display monitor at the customer and administrator workstations can visually indicate the direction of the detected object. Alternatively, the camera unit may be programmed to transmit a snap shot of the object moving into the room.

These techniques may also be used to track and zoom in on a face or other portion of a human body so that a high resolution snap shot may be taken and stored. The zooming operation will now be described. First, processor 439 writes zoom parameters into registers of ASIC 409. The zoom parameters (namely, location within the video frame and zoom resolution) may be provided by the processor 439 responsive to detecting an object moving (e.g., a person) or some other pre-defined event; alternatively the zoom parameters may be provided by the processor 439 pursuant to instructions transmitted to it by a user at either of a customer or administrator work station. The ASIC 409 then sends the zoom parameter information to scaler 412; alternatively the scaling function may be carried out by the FPGA 415. The scalar then zooms in on the selected region of interest provided by the zoom parameters, and transmits the zoomed video signal.

By analyzing the magnitude of the motion vectors associated with a detected object against the frame rate of the incoming video signals, the processor 439 may also calculate the speed of a detected object. Thus, objects that are moving too fast or too slow may be classified as not constituting an event.

As discussed above, the event detection features of each camera unit are also programmable to be time sensitive. For example, a camera unit may be programmed to transmit an alarm when there is no motion detected during a time of day where motion should be detected. For example, a camera unit may be installed in a room where bank employees constantly enter (or a room where employees report to work). If no motion is detected for a predetermined period of time during a programmed time of day where motion is expected, the camera unit transmits an alarm event to its customer server and the administrator server. Conversely, each particular camera unit may be programmed to transmit an alarm where there is an abnormal amount of motion or objects in its field of view. For example, a camera unit may be installed in a bank's safe room, and programmed to transmit an alarm if it detects too much movement over a predetermined period of time or too many objects (e.g., people) in the room.

Similarly, a camera unit may be programmable to transmit an alarm only after detecting certain types of activity for a predetermined period of time. For example, a camera unit may be installed in an alley way, and programmed to detect and transmit a loitering alarm event when an object is detected in its field of view and stays within its field of view for a predetermined period of time.

Each frame of video and audio information transmitted by the camera units includes information in a header that describes the frame. The header information includes: the camera unit's system identification number, time stamp information, the compression algorithm used to compress the frame, the size of the frame, the bit rate of the frame, and any relevant event tagging information describing the associated event. By including this information for each frame of video and audio information, the camera units can change the bit rate, the size of a video image, and the compression algorithm used on incoming video and audio signals on a frame by frame basis.

The header information for the event packets include for each event packet: the camera unit's system identification number, time stamp information, and the coded information describing the event.

The header information contained in the audio and video information and the event packet information allows the customer servers 40, the customer work stations 30, the administrator server 10, and the administrator work stations 20 to intelligently process, store, and display (as appropriate) these differently formatted frames.

In particular, the customer servers 40 and administrator server 10 capture the packets of frames of audio, video, and event data information transmitted by the camera units, analyze the header information contained in the frames, and build them into either video and/or audio frames or event data for storage and archival. The time stamp information in the headers of the video, audio, and event data information is used by the customer servers 40 and administrator server 10 to associatively index the event data with the corresponding video and/or audio information. The coded information in the event packets describing the event and the event tagging information in the audio and video frames may also be used to facilitate such indexing. This process is repeatable "n" times, once per camera unit channel (of which there are preferably multiple video, audio, and command/event channels). This allows multiple simultaneous streams to be stored, which in turn can be distributed to any number of customer or administrator work stations because the customer and administrator servers preferably have a dedicated communication talker for each connected work station.

Because the system is capable of generating and storing frames with arbitrarily changing properties, a specialized reader is also needed at the customer and administrator work stations. The user interface components of the customer and administrator work stations are designed to process successive frames of information that have differing compression algorithms, image size, bit rates, and other relevant header information. The header information contained in the information transmitted by the camera units is analyzed by the reader to allow the work stations to efficiently process and display such frames.

Figure 6:
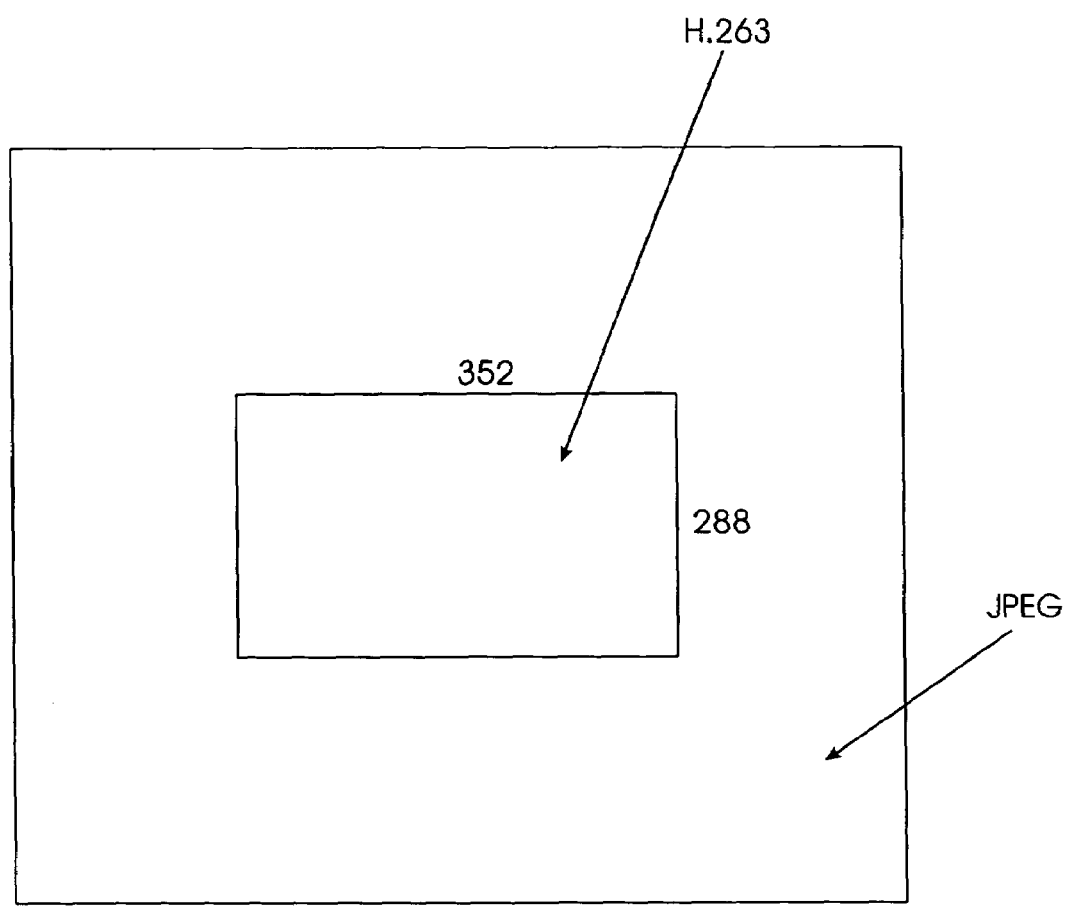
FIG. 6 depicts different frames of video that may be simultaneously transmitted by the camera units of the present invention.

The camera units also preferably have a dedicated channel for each video compression algorithm technique. This advantageously allows the camera units to transmit different images of the same scene simultaneously. This will be described in connection with FIG. 6. The H.263 video standard calls for a resolution of 352×288, while currently available CCD imagers are capable of providing images of 1024×1024 and higher. Thus, H.263 frames of video can be sampled as shown in FIG. 6, while simultaneously transmitting, e.g., 1024×1024 JPEG frames. The camera units, the servers, and the workstations, are also capable of handling other compression algorithm formats such as but not limited to Wavelets, MPEG-1, MPEG-2, MPEG-4, and MPEG-7, and the camera unit can simultaneously transmit video frames in these formats as well. These simultaneously transmitted, differently formatted frames may also differ in terms of bit rate, pixel coding depth, frame rate, and image size. By analyzing the header information contained within these frames, the multi-algorithm readers at the customer and administrative work stations and the customer and administrator servers can simultaneously read and display (as appropriate) these frames.

As described above, the camera units preferably time stamp the audio and video frames and the event data information as they are generated. The internal clock (preferably at the processor) used by a particular camera unit is preferably periodically updated via its customer server or the administrator server to reflect the exact correct time. Accordingly, a drift of more than a few milliseconds before a clock reset could cause the frames or event packet information to be stamped out of order. In order to prevent this, when the camera units receive correct time clock resets, the units do not immediately correct their internal clocks. Rather, the camera units shift their internal clocks by one millisecond (or some other negligible amount) per frame towards the received correct time so as to reduce the possibility of frames or event packet information being stamped out of order.

Figure 7:
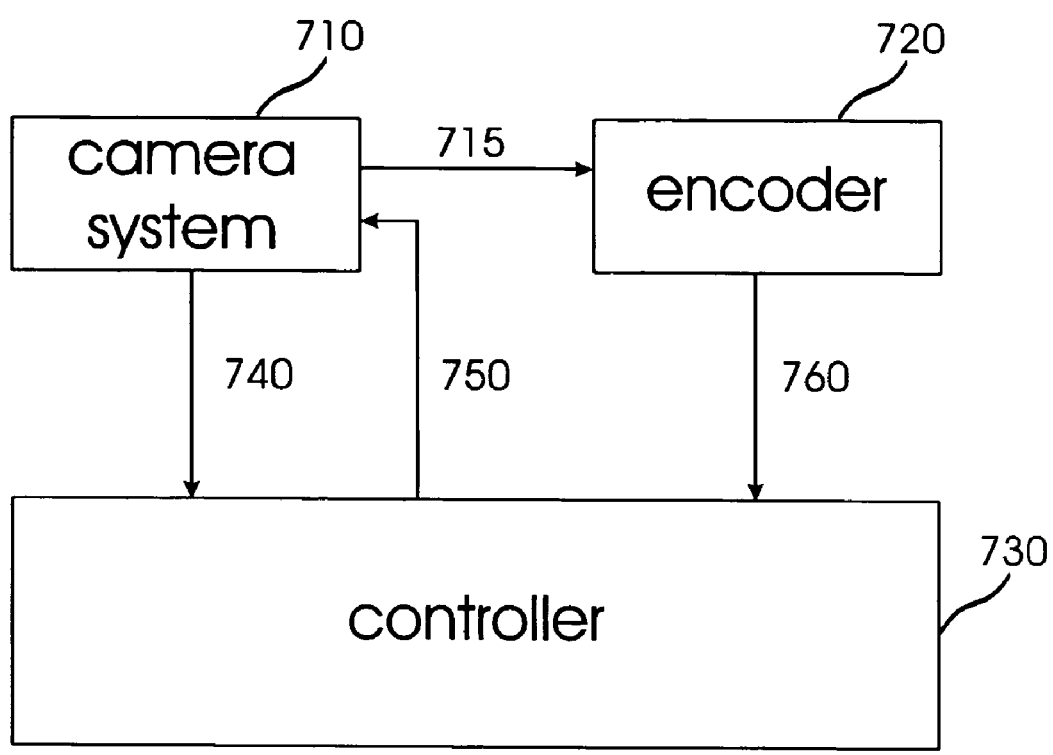
FIG. 7 is a block diagram of the intelligent gain controller of the present invention.

The camera units also include an intelligent automatic gain controller, an encoder buffer controller, and an intelligent network bandwidth controller that intelligently controls the transmission rate of signals outputted by the camera units based on network collision rates and the priority of each respective camera unit. These aspects of the camera units will now be described. The intelligent gain controller in the camera units is responsible for automatically adjusting the gain of the camera system so as to provide substantially constant image luminance for varying lighting conditions, and includes (with reference to FIG. 7) the camera system 710 (blocks 403–409 of FIG. 4); encoder 720 (a component of DSP block 430 of FIG. 4); and control block 730. Control block 730 is preferably a software program running on processor 439 of FIG. 4. Camera system 710 calculates and provides mean, maximum, and minimum intensity parameters to control block 730 on signal line 740. The encoder 720 calculates and provides variance (dynamic range) and delta (amount of motion) information to control block 730.

Figure 8:
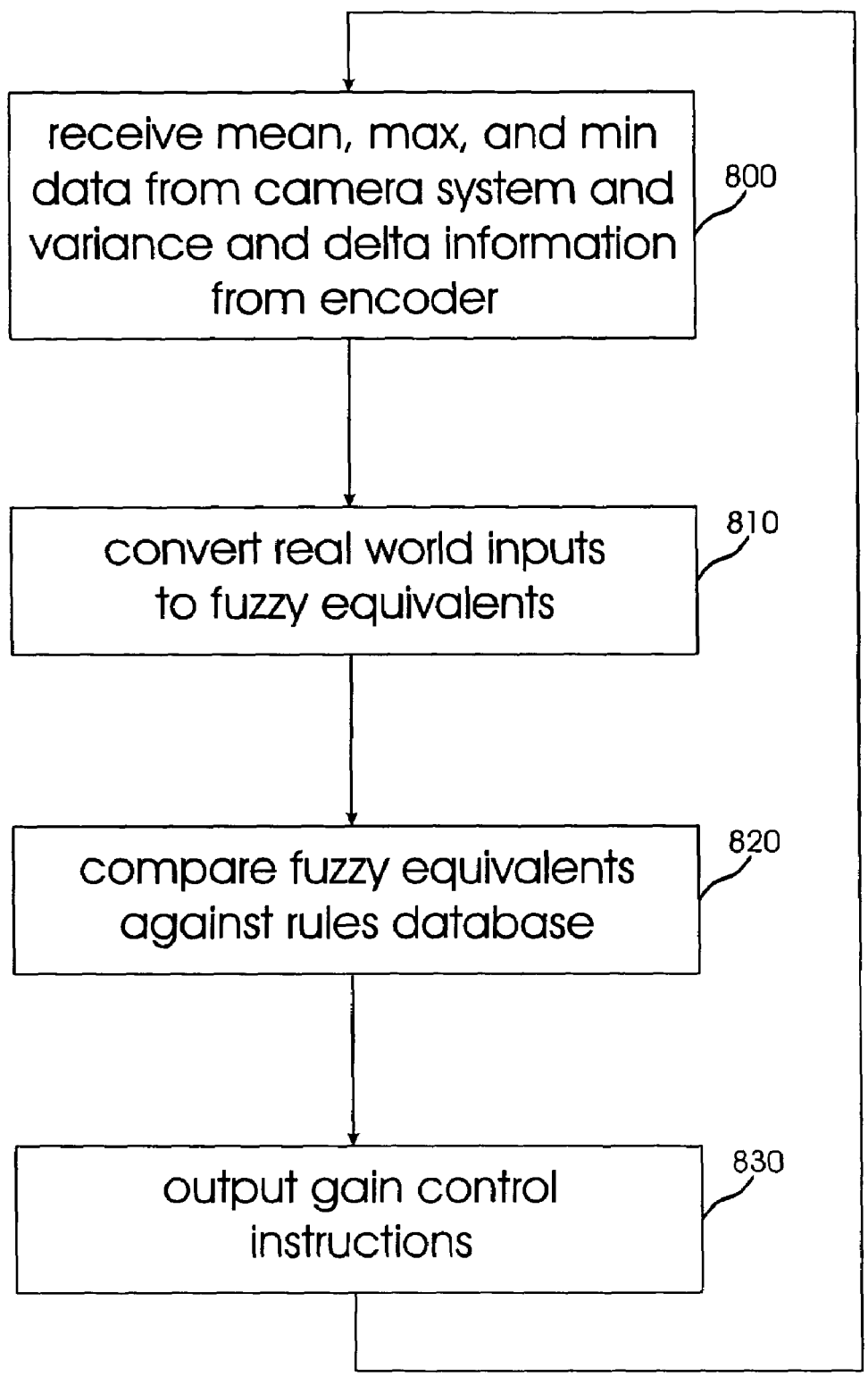
FIG. 8 is a flowchart that outlines the algorithm ran by the intelligent gain controller of FIG. 7.

As illustrated by flowchart diagram FIG. 8, the control block receives the mean, maximum, minimum, variance, and delta inputs at step 800, and then converts the real world inputs into their respective fuzzy equivalents (step 810). These fuzzy equivalents could, e.g., be a number between the range of 1 to 100. The five fuzzy equivalents are then compared (step 820) against a rule database that contains specific gain control instructions for different ranges of mean, maximum, minimum, variance, and delta fuzzy values. Based on the comparison step, the fuzzy control block outputs (step 830) a gain control signal on signal line 750 to the camera system 710. Specifically, the gain control signal is transmitted via signal line 440 of FIG. 4 to camera ASIC 409 of camera system 401 as shown in FIG. 4.

Figure 9:
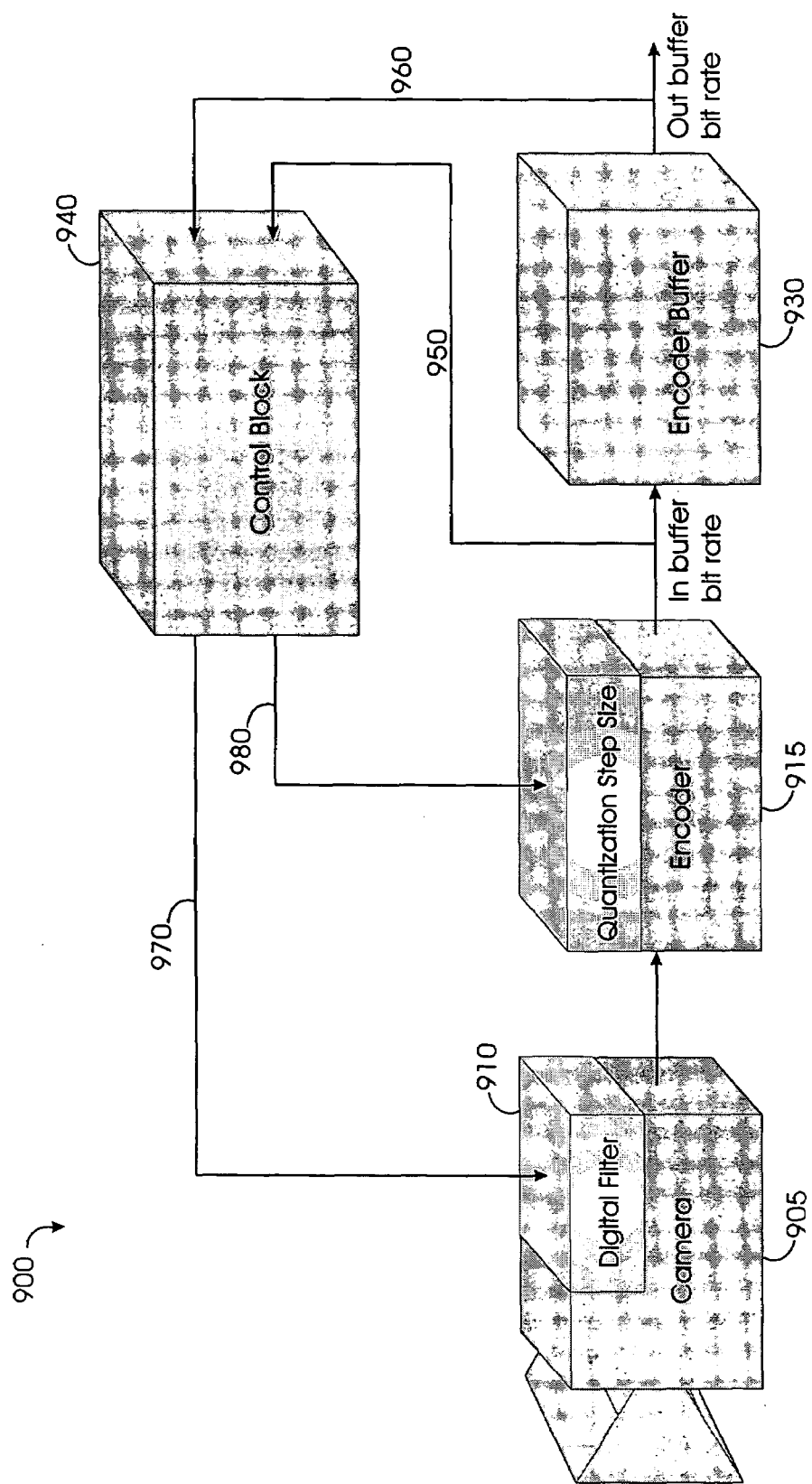
FIG. 9 is a block diagram of the encoder buffer controller.

As shown in FIG. 9, the camera units 400 also include a control system that controls the encoder buffer 930 of DSP block 430. The system includes the camera system 905, encoder 915, encoder buffer 930, and control block 940. Control block 940 is preferably a computer program running on processor 439. The control block 940 accepts as inputs input buffer and output buffer bit rates (950 and 960) calculated by the DSP block; alternatively it may receive buffer level information as computed by the DSP. The control block 940 provides as outputs a control signal to digital filter 910 contained within ASIC 409 of FIG. 4 and a quantization step size control input to quantization step size control unit of encoder 915.

The purpose of the control system of FIG. 9 is to ensure that encoder buffer 930 of DSP block 430 does not overflow (e.g., due to an absence of read requests from processor 439 of FIG. 4), while also optimizing the processing capabilities of the DSP block. The control block 940 increases the quantization step size 990 to reduce the in buffer bit rate 950, and decreases the quantization step size to increase the in buffer bit rate. The digital filter control signal 970 adjusts the input filtering of the incoming video signal 995 by instructing digital filter 910 in ASIC 409 to adjust the input video frequency. For example, the control block may instruct digital filter 910 to smooth out the incoming video signals by eliminating the high frequency content of the incoming video signals so that the encoder can more quickly process the incoming data.

Figure 10:
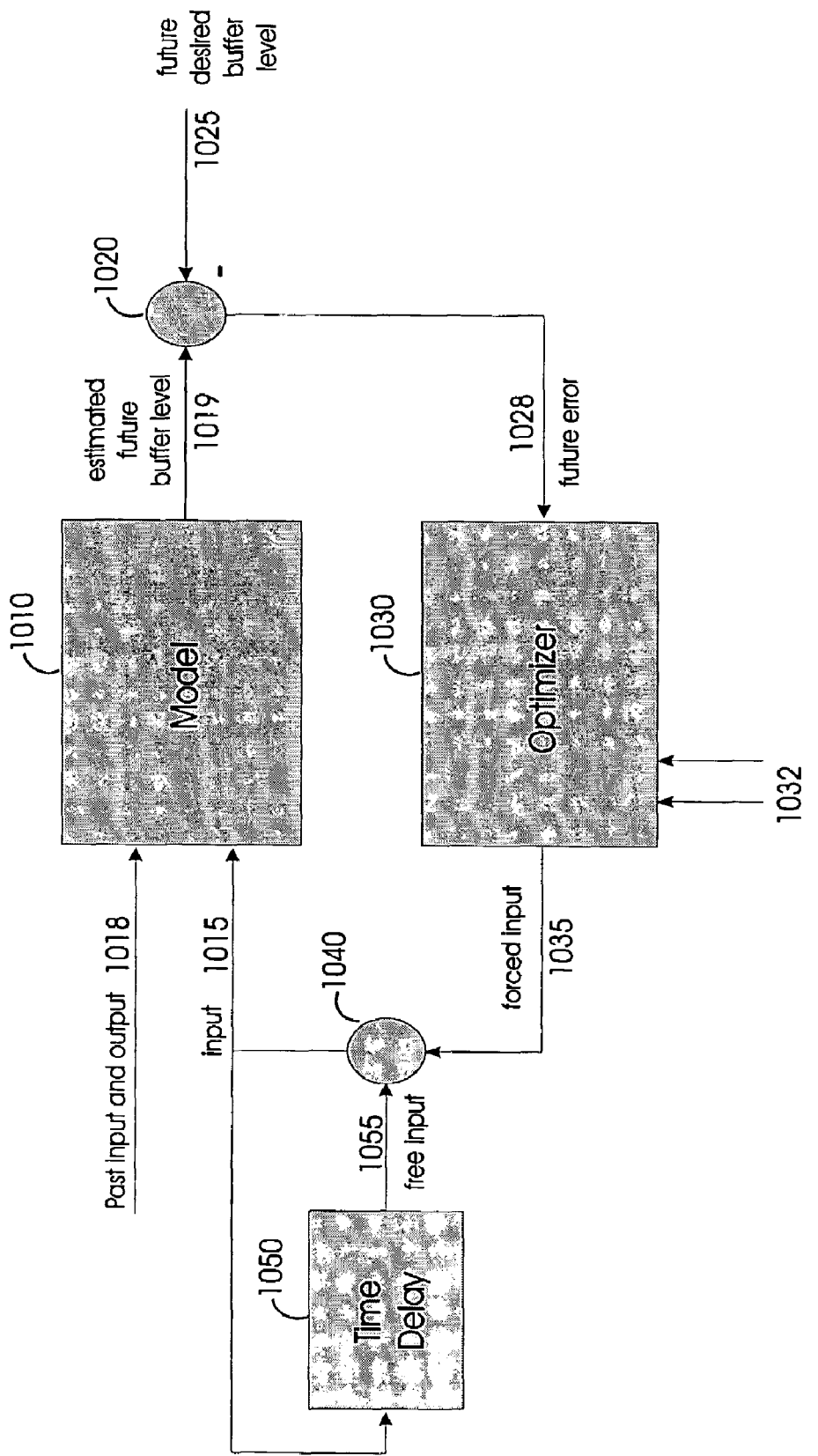
FIG. 10 depicts the preferred model predictive control algorithm for the encoder buffer controller.

FIG. 10 illustrates the preferred model predictive control algorithm that is utilized by the present invention to control the encoder buffer level. Modeling block 1010 receives as inputs the past inputs and outputs 1018 of modeling block 1010 and a present input 1015. The past inputs are the past digital filter and quantization step size control inputs (outputs 970 and 980 of FIG. 9), and the past output is the estimated future buffer level output. These inputs may be respectively represented by the equations {u(t−n),y(t−n), n>or =1 } and u(t), wherein t=time. The present input 1015 is the most recent output from control block 940 of FIG. 9.

The modeling block performs an adaptive filtering method or an normalized least square method (nLMS) on the input 1015 and past input and past output information 1018 in order to compute an estimated future buffer level 1019. The estimated future buffer level may be represented by the equation $\hat{y}(t+k/t)$ where $k=N_1$ to $N_2$ ($N_1$ being a minimal predicted horizon and $N_2$ being the maximum predicted horizon).

A summer 1020 then subtracts a future desired buffer level 1025 (which may be represented by the equation (r(t+k)) from the estimated future buffer level 1019 to compute a future error output 1028. The future error output is the error between the computed estimated future buffer level output 1019 and the future desired buffer level 1025. The future error output may be represented by the equation $\hat{e}(t+k/t)$, wherein $k=N_1$ to $N_2$.

An optimizer block 1030 then computes a forced input signal 1035 using the equation:

$$J(N_1, N_2, N_u) = \sum_{i=N_1}^{N_2} \delta(i)[\hat{y}(t+i/t) - r(t+i)]^2 + \sum_{i=1}^{N_u} \lambda(i)[\Delta u(t+i-1/t)]^2,$$

wherein $N_1$ is the minimal predicted horizon, $N_2$ is the maximal predicted horizon, $N_u$ is the maximum control horizon, $\delta(i)$ is a weighting function on the future error, and $\lambda(i)$ is a weighting function on the control effort. The first half of the equation relates to the future error and the second half of the equation relates to the control effort. As shown in FIG. 10, optimizer block 1030 may also receive inequality constraints 1032 which, if used, provide caps on what the quantization and digital filter control outputs may be.

The forced input 1035 (which may be represented by the equation $u_c(t)=\Delta u(t/t)$, $\Delta u(t+j-1/t)$, wherein $j=1$ to $N_u$) is then provided to a summer 1040. The summer 1040 sums the forced input 1035 with a free input 1055 (which is the forced input 1035 provided through a time delay 1050, and which may be represented by the equation $u_f(t)=u(t-1)$) to provide the input 1015.

In addition to the control system of FIGS. 9 and 10, the camera units 400 also include a network priority bandwidth controller. Each camera unit preferably includes customized software running on processor 439 (FIG. 4) that allows it to autonomously increase or decrease the transmission delay of signals output onto a network by the camera unit as a function of network collision jam signals (e.g., IEEE 802.3 jam signals) received by processor 439 and the priority of the camera unit. The priority of the camera unit may depend on whether, and what type of event data, the camera unit is transmitting at a particular time. The priority determination of the camera may also include variables as to where the camera unit is located (high priority location versus low priority location) and whether the camera unit is in an alarm on or alarm off state.

According to the scheme, lower priority camera units can increase their transmission delay to relieve congestion and decrease it slowly when the collision rate is reduced. Depending on the collision rate, higher priority camera units could maintain their transmission delay or slowly increase their transmission delay in response to collisions. If there are lower priority camera units on the network, they will relieve the congestion, leaving the higher priority camera units with more bandwidth. The higher priority camera units can also aggressively decrease their transmission delay as the collision rate decreases.

Figure 11:
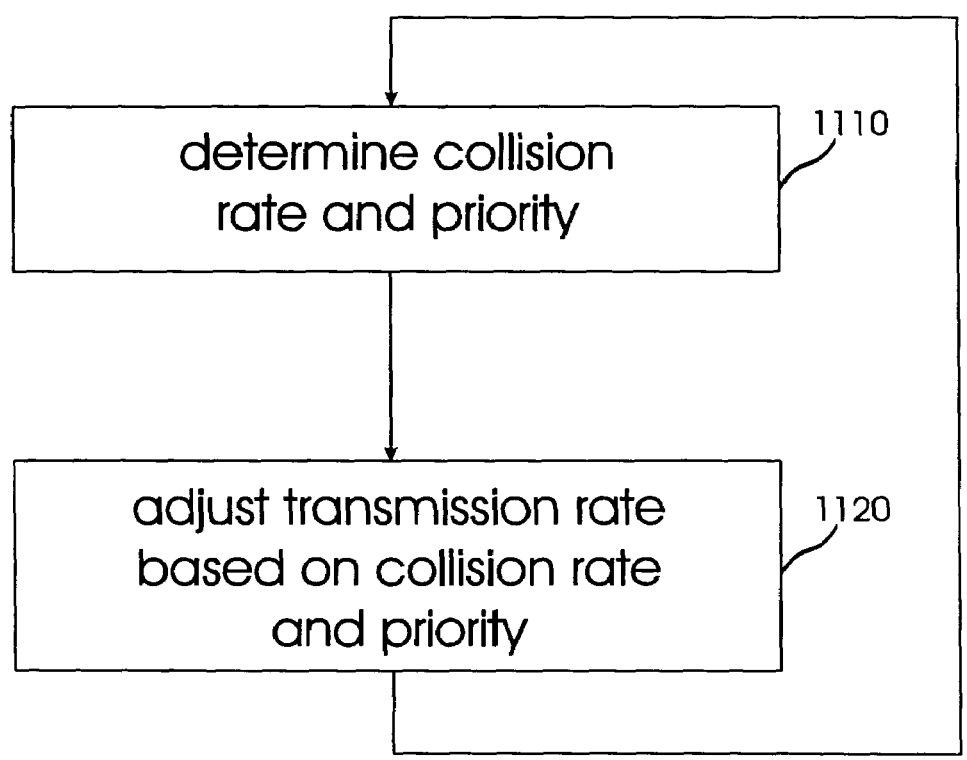
FIG. 11 is a flowchart that outlines the algorithm ran by the network priority bandwidth controller.

The network priority bandwidth scheme implemented by processor 439 is depicted in the flowchart of FIG. 11. The algorithm is a perpetual loop wherein the processor determines (1110) the collision rate and camera unit priority and adjusts (1120) the transmission delay based on the camera priority and collision rate. In the preferred embodiment, the transmission rate adjustment is based on a proportional integral differential loop.

As can be readily appreciated, this network priority bandwidth scheme may be used in any network environment. For example, computers and other nodes that are connected on the same network segment as the camera units may also include software running the network priority bandwidth scheme of the present invention, wherein the priority level of the computer or some other node depends upon its mode of operation at any given time. The network priority bandwidth scheme may also be utilized in a network environment that does not include the camera units of the present invention. In such a case, there should be a bypass mechanism to allow TCP acknowledgments of successfully received packets to bypass the transmission delay. This will prevent nodes outside the collision domain segment from erroneously retransmitting data that has successfully been received by node(s) within the collision domain segment.

Figure 13:
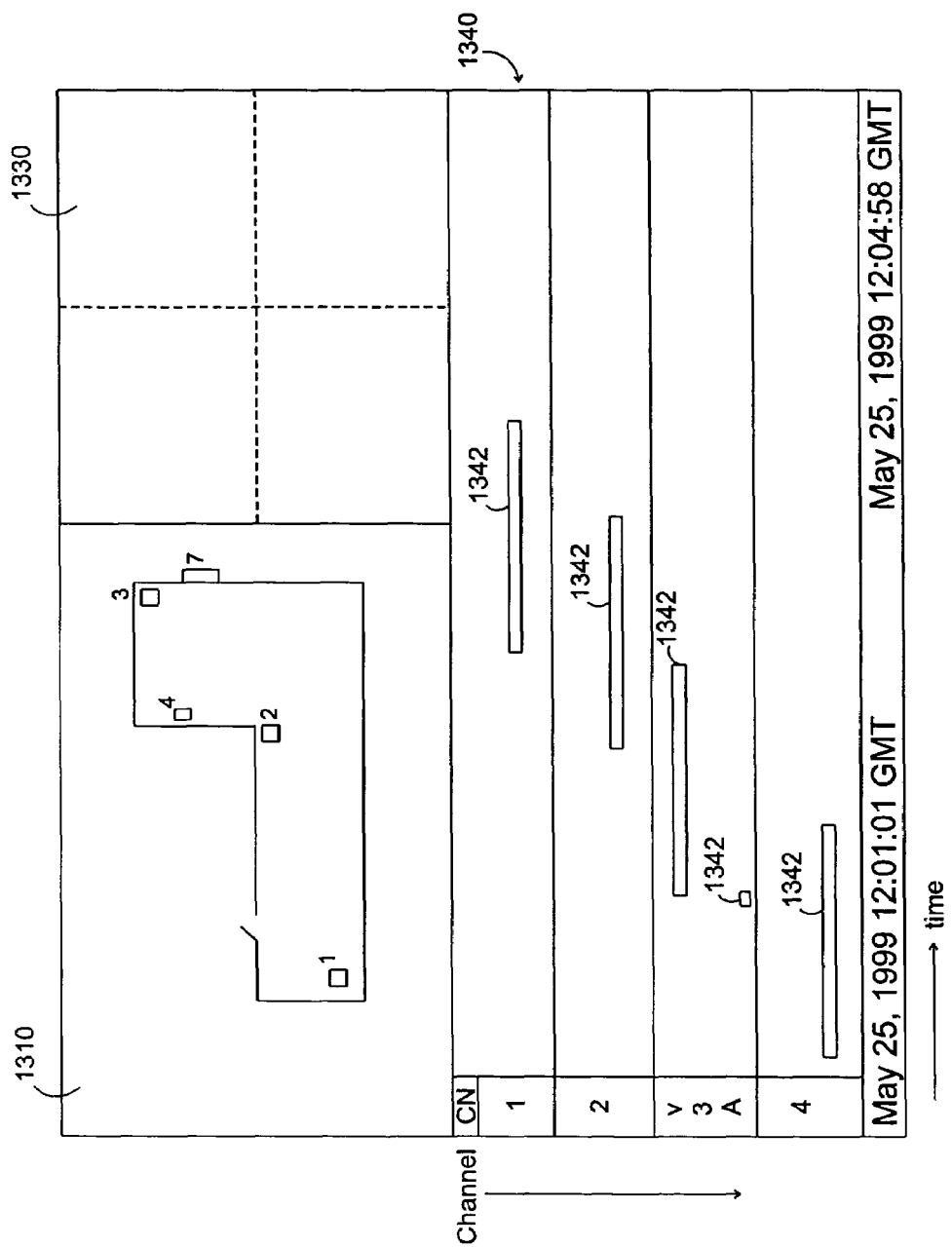
FIG. 13 is an illustrative "piano-roll" viewer interface page.

Features of the user interface will now be described in connection with FIGS. 12 and 13. Once a customer is authenticated by the administrator web server and has selected a specific monitored site (or an administrator employee at an administrative workstation has selected a specific monitored site), he is preferably presented with a floor plan layout window 1210, a viewing window 1230, and an event information window 1240. Each of the windows are resizable and moveable. The floor plan layout window 1210 shows the relative location of each camera unit 1220 on the floor shown, an indication 1222 (such as blinking) of whether a particular camera unit is experiencing an event state, and the particular event state of the camera unit 1223. The user may move from floor to floor by clicking on buttons 1212. If the user clicks on one of the camera units 1220, video information is streamed to the user's work station and displayed on the viewing window 1230 in substantially real time.

Video control buttons 1233 are then provided, and the date and time are also shown in viewing window 1230. The user may transmit zoom instructions by, e.g., using his cursor to draw a box around the portion of the image he would like to zoom in on, or by clicking on an area of the image he would like to zoom in on. The user may then via the user interface cause the display to provide the original un-zoomed image. One of video control buttons 1234 allows the viewer to view several streams of video information simultaneously.

The event information window preferably lists the type of stored information 1251, the channel number 1252, the location of the channel 1253, the event time 1254, and the event duration 1255. If the user clicks on one of the events 1250 in the event information window 1240, the associated video and/or audio clip is streamed to the user's work station and displayed on viewing window 1230. The event information window is updated as events occur, regardless of the viewing mode.

The viewer may alternatively search for stored video and audio information. The viewer may search for the desired information by inputting information via the user interface regarding any of the following: floor, channel (camera video or audio channel), event type, date, and time span. The search results are then displayed in a format that allows the viewer to view and/or listen to the retrieved audio and video information.

The viewer may also advantageously access a "piano roll" window interface. This interface is shown in FIG. 13. The "piano roll" interface schematically represents event durations for channels (camera video or audio channel) by using time bars 1342. The various channels are preferably listed in the piano roll interface window 1340 chronologically by the start time of the various events. In this way, the viewer can quickly determine how events between various channels interrelate. For example, by analyzing the time bars 1342 against the floor plan layout of window 1310, the viewer could quickly surmise that an intruder entered the floor by breaking the window 7 (see audio time bar on channel 3 and time bar on channel 4). The intruder's movements were then captured on video in an overlapping manner by channel 4, channel 3, channel 2, and channel 1. By clicking on the various time bars, the user may view and/or listen to the segments represented by time bars 1342 in viewing window 1330.

While the invention has been described in conjunction with specific embodiments, it is evident that numerous alternatives, modifications, and variations will be apparent to those skilled in the art in light of the foregoing description. For example, while the invention has been primarily described in connection with a digital security system. The system of the present invention could also be used to collect marketing and customer service research at retail establishments, assist in quality control in manufacturing locations, and document personnel issues. These and all other such alternatives, modifications, and variations to the present invention are considered to be within the scope of the invention as defined by the claims of the invention that are now or may later be presented. The inventors intend that all patentable subject matter disclosed herein eventually be the subject of patent claims.

What is claimed is:

1. A digital security system comprising:
    at least one camera unit for capturing and transmitting frames of video and/or audio signals over a communication network, wherein said camera unit is programmable to perform at least one of the following: to transmit a snap shot, streaming video, or an event clip upon detecting a predefined event, to simultaneously transmit a snap shot, streaming video and an event clip or combinations thereof upon detecting a predefined event, and to detect different predefined events based on the time of day, the camera unit includes a network bandwidth controller that adjusts the signal transmission delay of the camera unit as a function of a network collision rate and priority of the camera unit;
    at least one customer server coupled to the camera unit via the communications network;
    at least one customer work station coupled to the customer server via the communications network;
    an administrator server coupled to the at least one customer server via the communications network, wherein the administrator server receives event packets and associated video and/or audio information, and intelligently routes the event packets and information to one or more administrator work stations; and
    authentication means at the administrator server for authenticating a customer at the at least one customer work station so as to allow the work station to receive the video and/or audio signals transmitted by the at least one camera unit.

2. The system of claim 1, wherein the camera unit transmits video and/or audio signals over the communications network only after detecting a predefined event.

3. The system of claim 1, wherein the camera unit transmits video and/or audio signals over the communications network in response to receiving a command from a user at the customer work station or at least one administrator work station.

4. The system of claim 1, wherein the camera unit tags the frames of video and/or audio signals based upon detecting one of a plurality of predefined events.

5. The system of claim 1, wherein the camera unit transmits at least one event packet when a predefined event is detected.

6. The system of claim 1, wherein the camera unit is operable in a plurality of modes.

7. The system of claim 6, wherein the camera unit may be remotely configured to operate in one of the plurality of modes via the at least one customer work station.

8. The system of claim 1, wherein the camera unit includes a glass break detector.

9. The system of claim 8, wherein the glass break detector includes: an audio input receiver means, a digital signal processor for computing spectrograms of incoming audio signals, and a means for comparing a predefined glass break spectrogram template against the spectrograms computed by the digital signal processor.

10. The system of claim 1, wherein the camera unit includes a motion detector that analyzes the video signals captured by the camera unit.

11. The system of claim 10, wherein the motion detector comprises a digital signal processor that includes an automatic learn component that automatically updates a stored background image against which the digital signal processor performs motion analysis detection.

12. The system of claim 10, wherein the camera unit increases one or more of the bit rate, pixel coding depth, the image size, fame rate, and compression algorithm format associated with the video signals in response to detecting motion in the video signals.

13. The system of claim 10, wherein the camera unit includes an object detector.

14. The system of claim 10, wherein the camera unit includes an object speed detector.

15. The system of claim 14, wherein the camera unit determines whether to transmit an event packet over the network based on the speed of the detected object.

16. The system of claim 10, wherein the camera unit includes an object movement detector that detects the direction of movement of a detected object.

17. The system of claim 16, wherein the camera unit determines whether to transmit at least one event packet over the network based on what direction the detected object is moving.

18. The system of claim 1, wherein the authentication means includes means to compare inputted user identification information against a database of monitored sites to which the user may access.

19. The system of claim 1, wherein the administrator server includes means for receiving event packet information from the at least one camera unit, and means for transmitting relevant contact information to one or more administrator work stations.

20. The system of claim 1, wherein the administrator server includes means for receiving the event packet information from the at least one camera unit and means for automatically contacting one or more of the local police, local fire department, and customer contact.

21. The system of claim 1, wherein the camera unit includes: a camera system; an encoder coupled to the camera system that encodes the video signals transmitted by the camera system; and an automatic gain controller coupled to the camera system and the encoder, the automatic gain controller receiving mean, maximum, and minimum intensity video signal values from the camera system, and variance and delta values from the encoder, and providing in response a control signal that controls the gain of the camera system so that the camera unit transmits video signals with substantially constant image luminance for varying lighting conditions.

22. The system of claim 1, wherein the camera unit includes:
    a camera system;
    an encoder coupled to the camera system that encodes the video signals transmitted by the camera unit;
    an encoder buffer coupled to the encoder; and
    an encoder buffer controller coupled to the camera system and the encoder buffer, the encoder buffer controller receiving as inputs an in buffer bit rate input from the encoder, and an out buffer bit rate from the encoder buffer.

23. The system of claim 1, wherein the camera unit autonomously determines its priority based on the type of predefined event it is experiencing.

24. The system of claim 1, wherein the camera unit is coupled to a conventional sensor.

25. The system of claim 24, wherein the camera unit is configured to receive an alarm signal from the conventional sensor, and to transmit an event packet over the network in response to receiving the alarm signal from the conventional sensor.

26. The System of claim 25, wherein the camera unit starts transmitting video and/or audio signals in response to receiving the alarm signal from the conventional sensor.

27. The system of claim 25, wherein the camera unit changes a characteristic of transmitted video and/or audio signals in response to receiving the alarm signal from the conventional sensor.

28. The system of claim 24, wherein the camera unit performs boolean analysis of an alarm signal sent by the conventional sensor and an event detected by the camera unit before transmitting an event packet over the network.

29. The system of claim 1, wherein the camera unit simultaneously transmits video signals in more than one compression algorithm standard format in response to detecting certain predefined events.

30. The system of claim 1, wherein the camera unit simultaneously transmits video signals according to the JPEG format and the H.263 format in response to detecting certain predefined events.

31. The system of claim 1, wherein the camera unit simultaneously transmits video signals having differing bit rates.

32. The system of claim 1, wherein the camera unit simultaneously transmits video signals having differing frame rates.

33. The system of claim 1, wherein the camera unit simultaneously transmits video signals having differing pixel coding depths.

34. The system of claim 1, further comprising at least one administrator workstation coupled to the administrator server.

35. The system of claim 34, wherein a graphical user interface is provided at one of the administrator or customer workstations, and wherein the graphical user interface schematically displays event durations for a plurality of camera units.

36. The system of claim 34, wherein the video or audio information schematically represented by the event duration display is accessible by a user clicking on the event duration display.

37. The system of 34, wherein the customer and administrator work stations include a multi-algorithm reader that allows the work stations to display successive frames of video signals encoded in different compression algorithm standard formats.

38. The system of claim 4, wherein the camera unit tags the frames of video and/or audio signals by inserting information in the header of the transmitted frames that identifies the predefined event.

39. The system of claim 5, wherein the event packet includes information in the header of the event packet that identifies the predefined event.

* * * * *